US012675940B2

(12) United States Patent
Ohba

(10) Patent No.: US 12,675,940 B2
(45) Date of Patent: Jul. 7, 2026

(54) IMAGE PROCESSING FOR DISPLAY OF MULTI-DIMENSIONAL OBJECTS

(71) Applicant: Sony Interactive Entertainment Inc., Tokyo (JP)

(72) Inventor: Akio Ohba, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 384 days.

(21) Appl. No.: 18/253,067

(22) PCT Filed: Nov. 26, 2020

(86) PCT No.: PCT/JP2020/044101
§ 371 (c)(1),
(2) Date: May 16, 2023

(87) PCT Pub. No.: WO2022/113246
PCT Pub. Date: Jun. 2, 2022

(65) Prior Publication Data
US 2023/0351674 A1 Nov. 2, 2023

(51) Int. Cl.
*G06T 15/06* (2011.01)
*G06T 9/00* (2006.01)
*G06T 15/00* (2011.01)
(52) U.S. Cl.
CPC .............. *G06T 15/06* (2013.01); *G06T 9/00* (2013.01); *G06T 15/005* (2013.01)
(58) Field of Classification Search
None
See application file for complete search history.

(56) References Cited

U.S. PATENT DOCUMENTS 8,947,448 B2 * 2/2015 Segawa .................. G06T 15/04
345/589
2011/0261049 A1 * 10/2011 Cardno .................. G06Q 40/04
345/419

(Continued)

FOREIGN PATENT DOCUMENTS

CN 111105491 A 5/2020
JP 2007328460 A 12/2007

(Continued)

OTHER PUBLICATIONS

Art Tevs, Ivo Ihrke and Hans-Peter Seidel, "Maximum Mipmaps for Fast, Accurate, and Scalable Dynamic Height Field Rendering", 2008, ICD '08: Proceedings of the 2008 Symposium on Interactive 3D Graphics and Games, pp. 183-190 (Year: 2008).*

(Continued)

*Primary Examiner* — Michael J Cobb
(74) *Attorney, Agent, or Firm* — Kilpatrick Townsend & Stockton LLP

(57) ABSTRACT

In a storage device are stored, as reference maps, a background map, a color map of an object, and a height map of the object as hierarchical data having a plurality of resolutions. An image processing device loads, when necessary, portions thereof which are required for rendering into a main memory according to movement of a viewpoint, etc., decodes and decompresses portions thereof, and develops the resulting pieces of data in a memory inside a GPU. The GPU refers to these pieces of data to render a display image through ray tracing.

20 Claims, 16 Drawing Sheets

(56) References Cited

U.S. PATENT DOCUMENTS

2015/0348285 A1\* 12/2015 Wang ...................... G06T 11/10
                                                    345/582
2017/0178397 A1\*  6/2017 Hillesland ............... G06T 15/04

FOREIGN PATENT DOCUMENTS

JP          2011090648 A     5/2011
JP          2011134101 A     7/2011

OTHER PUBLICATIONS

Christian Dick, Jens Kruger, and Rudiger Westermann, "GPU Ray-Casting for Scalable Terrain Rendering", 2009, Eurographics 2009—Areas Papers, pp. 1-8 (Year: 2009).\*
Patrick Cozzi, Kevin Ring, "3D Engine Design for Virtual Globes", 2011, CPC Press, Boca Raton, FL, ISBN: 13: 978-1-4398-6558-3 (eBook—PDF) (Year: 2011).\*
International Search Report for corresponding PCT Application No. PCT/JP/2020/044101, 5 pages, dated Feb. 22, 2021.
Takeshi Suzuki: "An Accelerated Relief Mapping Using Depth Maps," IPSJ SIG Technical Reports, vol. 2006, No. 18, pp. 69-74, Feb. 21, 2006 (for Relevancy, see English Abstract and Non-Pat. Lit. #1).

\* cited by examiner

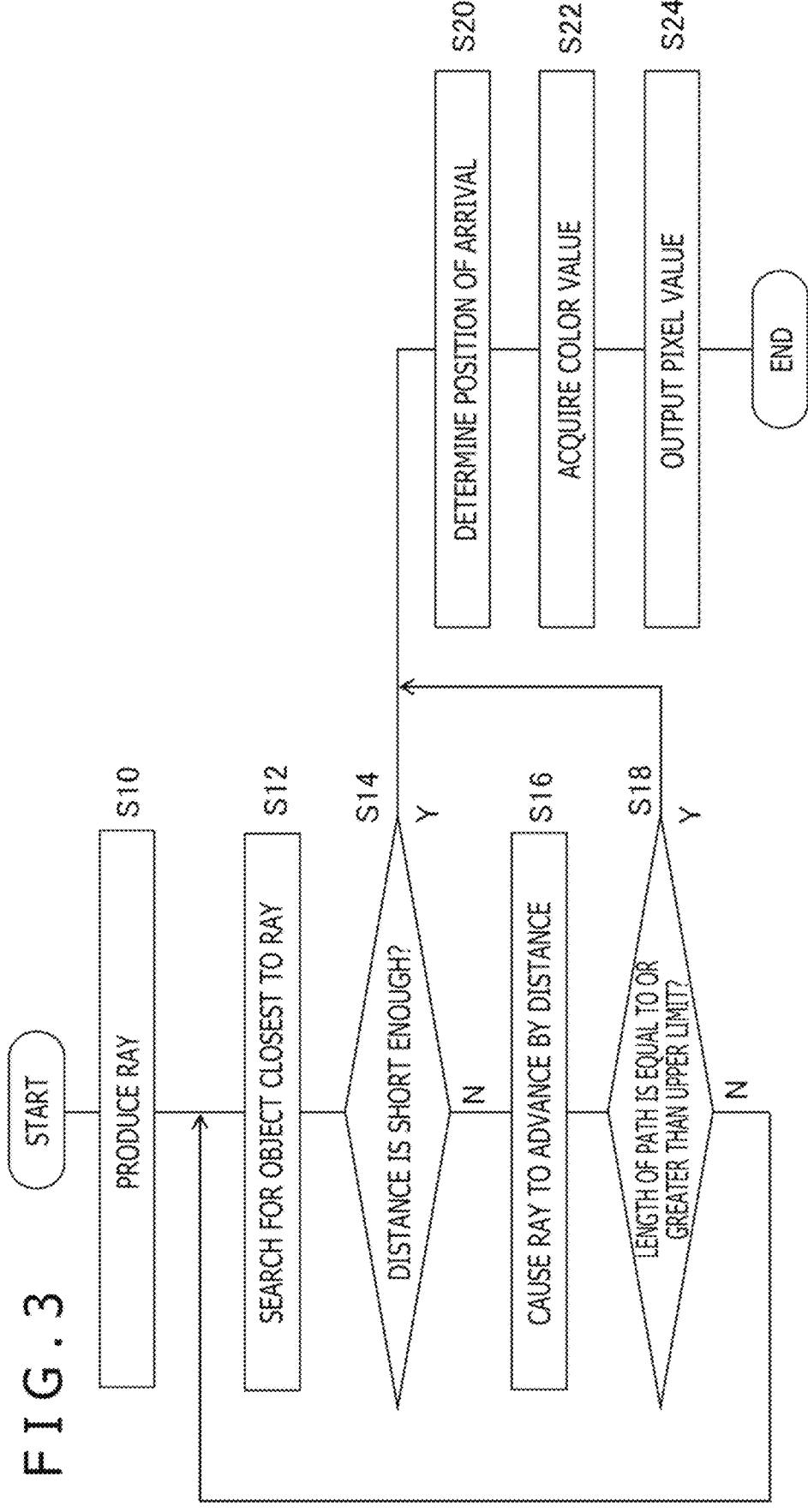
F I G . 3

FIG.6
(a)
(b)
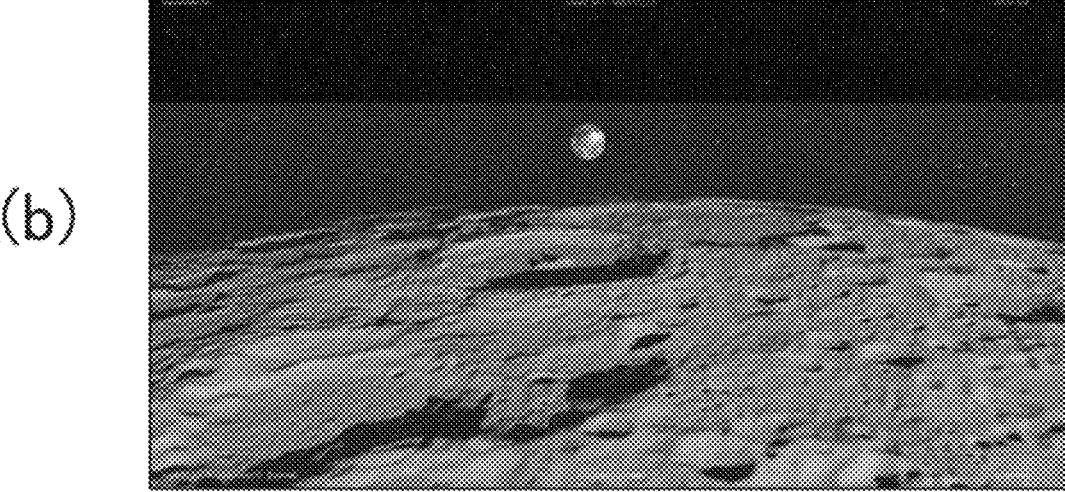
(c)
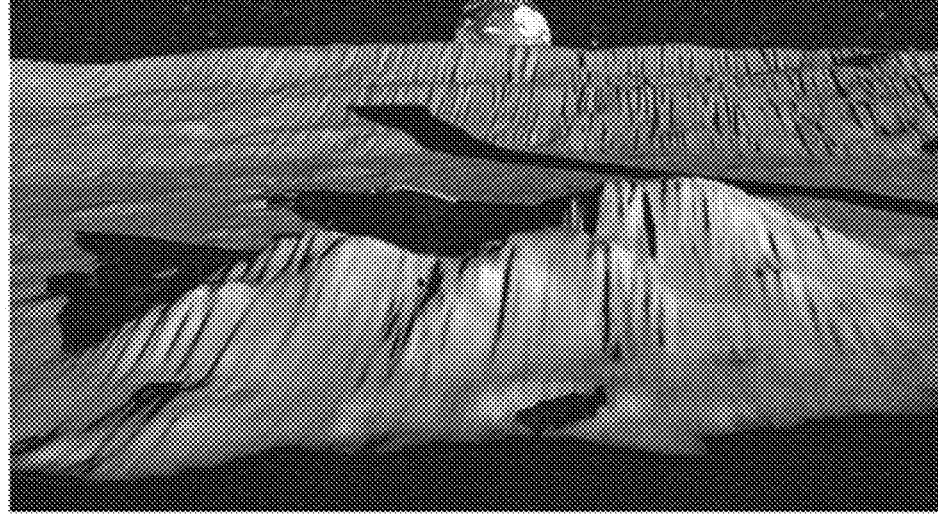

FIG.7
(a)
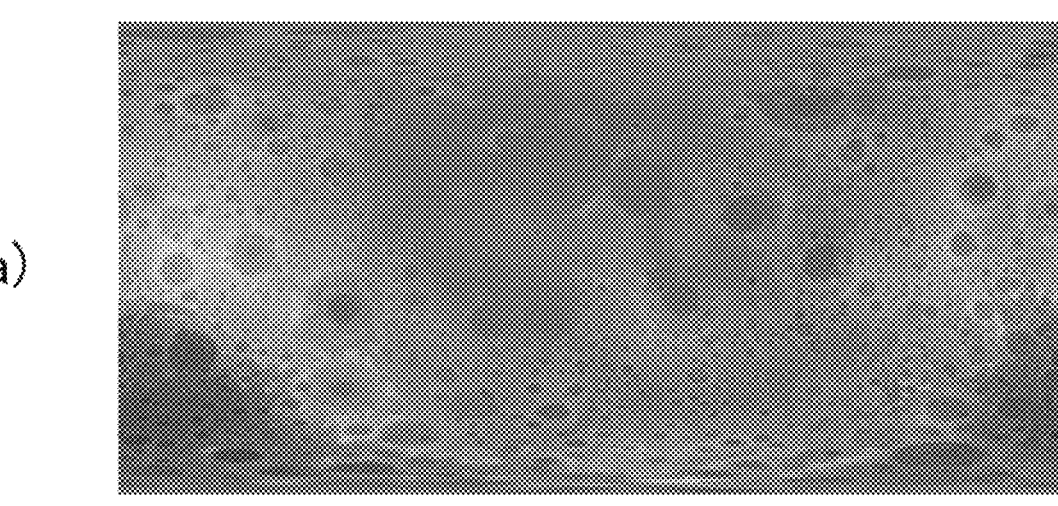
(b)
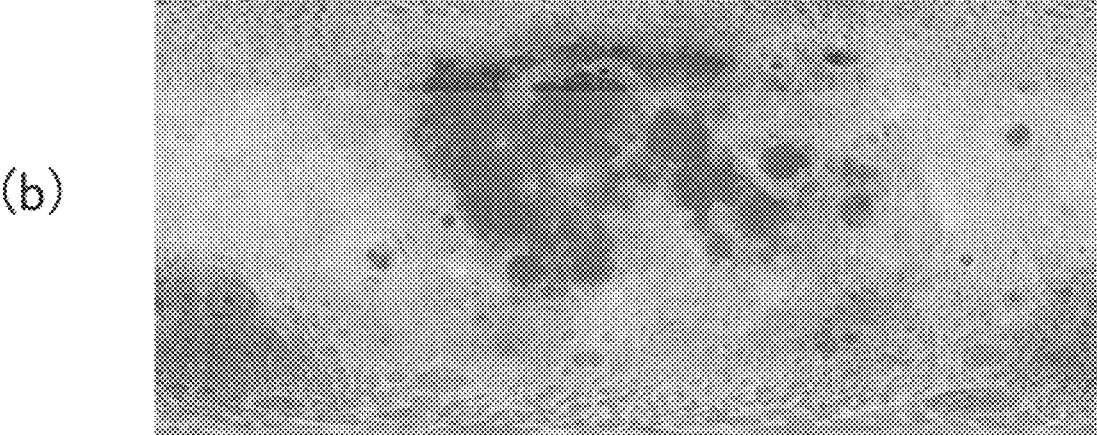

| 22 | 24 | 26 |
|----|----|----|
| CPU | GPU | MAIN MEMORY |

30

INPUT/OUTPUT INTERFACE — 28

| COMMUNICATION SECTION | STORAGE SECTION | OUTPUT SECTION | INPUT SECTION | RECORDING MEDIUM DRIVING SECTION |
|----|----|----|----|----|
| 32 | 34 | 36 | 38 | 40 |

10

F I G . 1 2

IMAGE PROCESSING DEVICE — 10

INPUT DEVICE 14

INPUT INFORMATION ACQUISITION SECTION — 70

TARGET DATA DETERMINATION SECTION — 72

TILE DATA ACQUISITION SECTION — 74

COMPRESSED DATA STORAGE SECTION — 76

DECODING/ DECOMPRESSION SECTION — 78

TILE DATA STORAGE SECTION — 80

RENDERING SECTION — 82

OUTPUT SECTION — 84

DISPLAY DEVICE 16

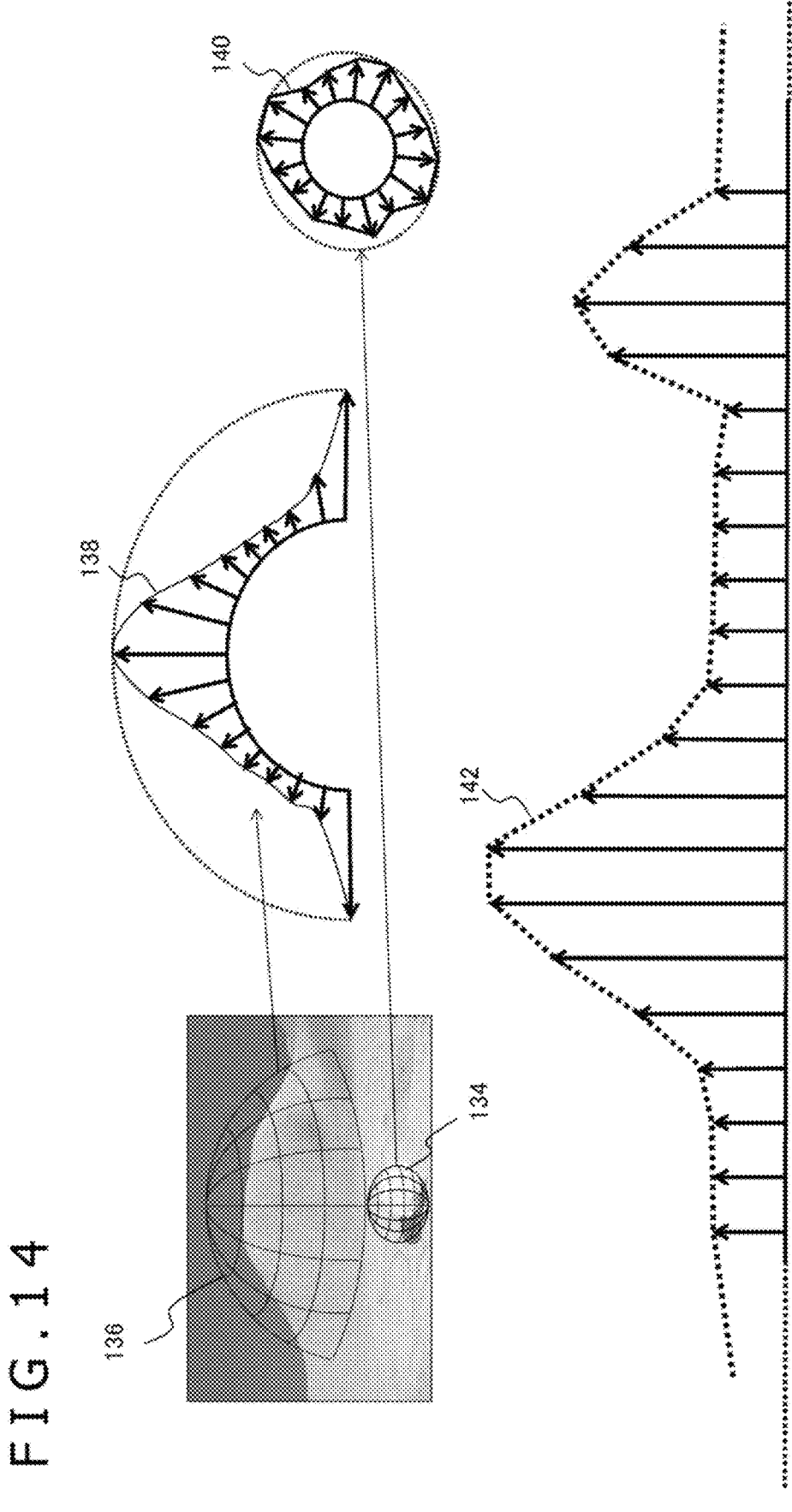
F I G . 1 4

F I G . 1 7
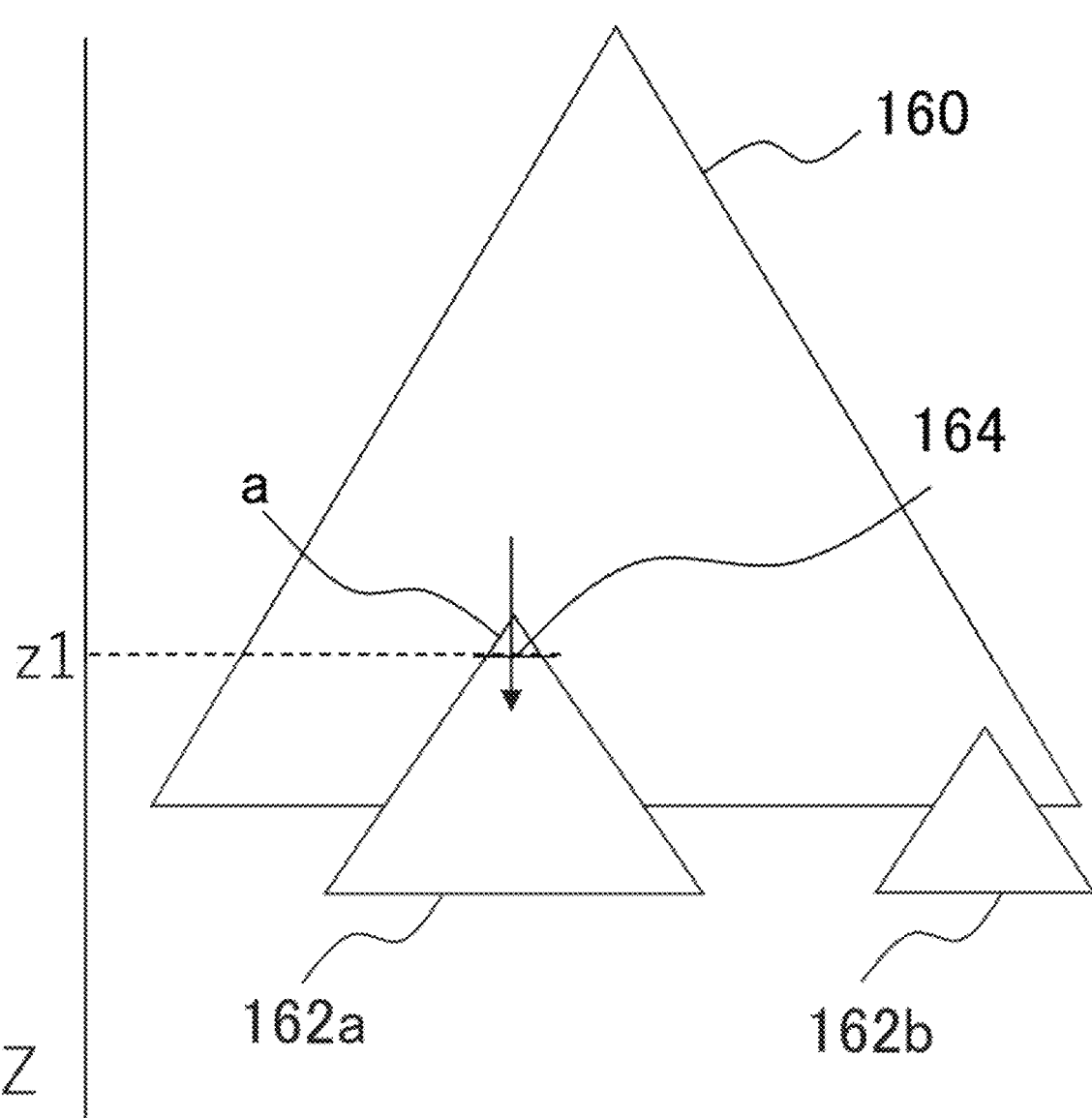

IMAGE PROCESSING FOR DISPLAY OF MULTI-DIMENSIONAL OBJECTS

TECHNICAL FIELD

This invention relates to an image processing device and an image processing method that generate a display image.

BACKGROUND ART

Recent improvements in information processing technology and image display technology have made it possible to experience visual worlds in various forms. For example, causing a head-mounted display to display a panoramic video and display images that match a line of sight of a user makes it possible to enhance a sense of immersion into a visual world and improve operability of an application such as a game. In addition, causing streaming image data transferred from a server having abundant resources to be displayed enables a user to enjoy a high-definition moving image or game screen on any scale at any place.

SUMMARY

Technical Problems

Regardless of the purpose of image display and the form of display, increasing efficiency with which images are rendered and displayed is always an important issue. For example, in a mode in which a three-dimensional object is to be viewed from various angles with flexibility allowed in a viewpoint and a line of sight, high responsivity is required of change in display that accompanies the movement of the viewpoint. This similarly applies to a case where a three-dimensional object moves or changes in shape. Meanwhile, displaying high-quality images requires increasing the resolution and performing complicated calculation, which leads to an increased load of image processing. This can easily lead to a delay in change of an image of an object that is to be represented.

The present invention has been conceived in view of such problems, and an object thereof is to provide a technology for causing an image including a three-dimensional object to be displayed with low delay and high quality.

Solution to Problems

To solve the problems as described above, an embodiment of the present invention relates to an image processing device. This image processing device includes a data acquisition section that loads portions of pieces of hierarchical data representing, in different resolutions, a color map representing a distribution of color values over a surface of an object to be displayed and a height map representing a distribution of height relative to a basic shape over the surface, the portions being required for rendering of the object, a rendering section that obtains a point on the object at which a ray in ray tracing arrives, by referring to the height map loaded, and then acquires a color value of the object at the point of arrival by referring to the color map, to determine a pixel value of a display image, and an output section that outputs data of the display image.

Another mode of the present invention relates to an image processing method. This image processing method is employed by an image processing device, the method including a step of loading, into a memory, portions of pieces of hierarchical data representing, in different resolutions, a color map representing a distribution of color values over a surface of an object to be displayed and a height map representing a distribution of height relative to a basic shape over the surface, the portions being required for rendering of the object, a step of obtaining a point on the object at which a ray in ray tracing arrives, by referring to the height map loaded, and then acquiring a color value of the object at the point of arrival by referring to the color map, to determine a pixel value of a display image, and a step of outputting data of the display image.

Note that any combinations of constituent elements described above, and a method, a device, a system, a computer program, a data structure, a recording medium, and so on which have features of the present invention are also effective as embodiments of the present invention.

Advantageous Effect of Invention

The present invention enables an image including a three-dimensional object to be displayed with low delay and high quality.

BRIEF DESCRIPTION OF DRAWINGS

FIG. 3 is a flowchart illustrating a procedure for determining a pixel value when ray marching is adopted in the present embodiment.

FIG. 4 is a diagram for explaining an effect of use of a height map on ray tracing in the present embodiment.

FIG. 5 illustrates example shapes of reference maps that can be used in the present embodiment.

FIG. 6 illustrates example display images when the moon is to be displayed in the present embodiment.

FIG. 7 illustrates examples of reference maps that can be used when the moon as illustrated in FIG. 6 is represented.

FIG. 12 is a diagram illustrating functional blocks of the image processing device according to the present embodiment.

FIG. 14 is a diagram representing examples of reference maps that are prepared in a mode in which a plurality of pieces of model data are used in combination in the present embodiment.

FIG. 17 is a diagram for explaining a technique of defining a switch between a base model and a part model in the present embodiment.

DESCRIPTION OF EMBODIMENT

Figure 1:
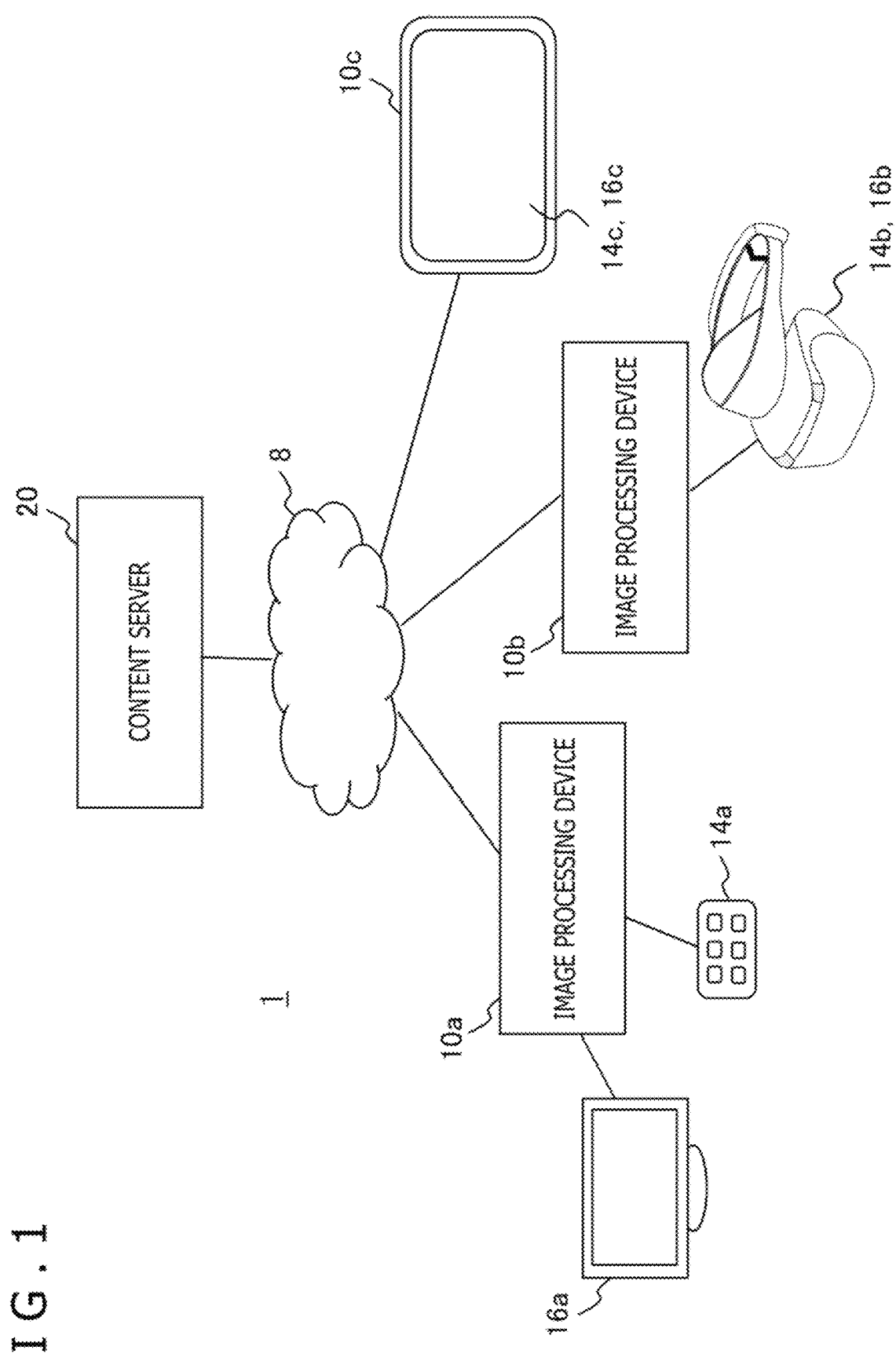
FIG. 1 is a diagram illustrating an example configuration of an image display system according to the present embodiment.

FIG. 1 illustrates an example configuration of an image display system to which the present embodiment is applicable. An image display system 1 includes image processing devices 10*a*. 10*b*, and 10*c*, which cause images to be displayed according to user operations, and a content server 20, which provides image data used for display. To the image processing devices 10*a*, 10*b*, and 10*c* are connected input devices 14*a*, 14*b*, and 14*c*, respectively, for the user operations and display devices 16*a*, 16*b*, and 16*c*, respectively, which display images. Communication between the image processing devices 10*a*, 10*b*, and 10*c* and the content server 20 can be established through a network 8 such as a WAN (World Wide Network) or a LAN (Local Area Network).

The image processing devices 10*a*, 10*b*, and 10*c* may be connected to the display devices 16*a*, 16*b*, and 16*c*, respectively, and the input devices 14*a*, 14*b*, and 14*c*, respectively, either in a wired manner or in a wireless manner. Alternatively, two or more of these devices may be incorporated in a unit. For example, in the figure, the image processing device 10*b* is connected to a head-mounted display, which is the display device 16*b*. The head-mounted display, which is capable of changing the visual field of a display image according to movement of a user who wears the head-mounted display on the head, functions also as the input device 14*b*.

Meanwhile, the image processing device 10*c* is a portable terminal, and forms an integral unit together with the display device 16*c* and the input device 14*c*, which is a touchpad covering a screen of the display device 16*c*. As suggested above, there are no limitations on the outer appearances and manners of connection of the devices illustrated. In addition, there are no limitations on the number of image processing devices 10*a*, 10*b*, and 10*c* connected to the network 8 and the number of content servers 20 connected to the network 8. Hereinafter, the image processing devices 10*a*. 10*b*, and 10*c*, the input devices 14*a*, 14*b*, and 14*c*, and the display devices 16*a*. 16*b*, and 16*c* will be referred to collectively as image processing devices 10, input devices 14, and display devices 16, respectively.

The input device 14 may be one of common input devices, such as a controller, a keyboard, a mouse, a touchpad, and a joystick, or any combination of these devices, and supplies the contents of a user operation to the image processing device 10. The display device 16 may be a common display, such as a liquid crystal display, a plasma display, an organic EL (Electroluminescent) display, a wearable display, or a projector, and displays an image outputted from the image processing device 10.

The content server 20 provides, to the image processing device 10, data of content involving image display. The type of such content is not limited to any particular types, and the content may be any of a computerized game, an image for viewing, a web page, an electronic newspaper, an electronic book, and so on. The image processing device 10 may accomplish a display process while acquiring content data to be used for display from the content server 20, or may read, from an internal storage device, content data acquired in advance, and use the content data for display. In the latter case, the source of the content data may not necessarily be the content server 20, and may alternatively be a recording medium.

In the present embodiment, at least a portion of a display target is formed by a three-dimensional object. This three-dimensional object may be either created by human labor or obtained through photographing (actual measurement) as long as the three-dimensional shape and color information thereof are obtained. For example, the image processing device 10 causes images of an object that is a display target as seen from a flexible angle to be displayed according to user operations inputted via the input device 14. Alternatively, the image processing device 10 may control the viewpoint and/or the line of sight for an object according to progression of a game or the like.

The three-dimensional object may be stationary or may move or change in posture. Also, the three-dimensional object may change in shape. In any case, the image processing device 10 generates display images including a three-dimensional object at a predetermined rate, and thus causes a moving image to be displayed. In the field of computer graphics, technologies for displaying three-dimensional objects have greatly developed in both hardware and software. For example, path tracing, which is one type of ray tracing, reduces the amount of computation by probabilistically performing calculation of a rendering equation, which expresses the relation between a ray (ray of light) and a surface of an object, by employing a Monte Carlo method.

In recent years, it has also become possible to use a polygon model for rasterization in ray tracing by using an acceleration data structure, such as a BVH (Bounding Volume Hierarchy), to increase efficiency in determination of an intersection between a ray and an object. However, as models of display targets become more complicated and greater in scale, the load of computation increases correspondingly, making it difficult to represent real images that follow the change in the viewpoint, the line of sight, and/or the state of an object. The present embodiment adopts a technique for reducing the load of processing at the time of image display by acquiring, in advance, maps representing distributions of the color of an object and differences in level of a surface of the object over the surface.

Figure 2:
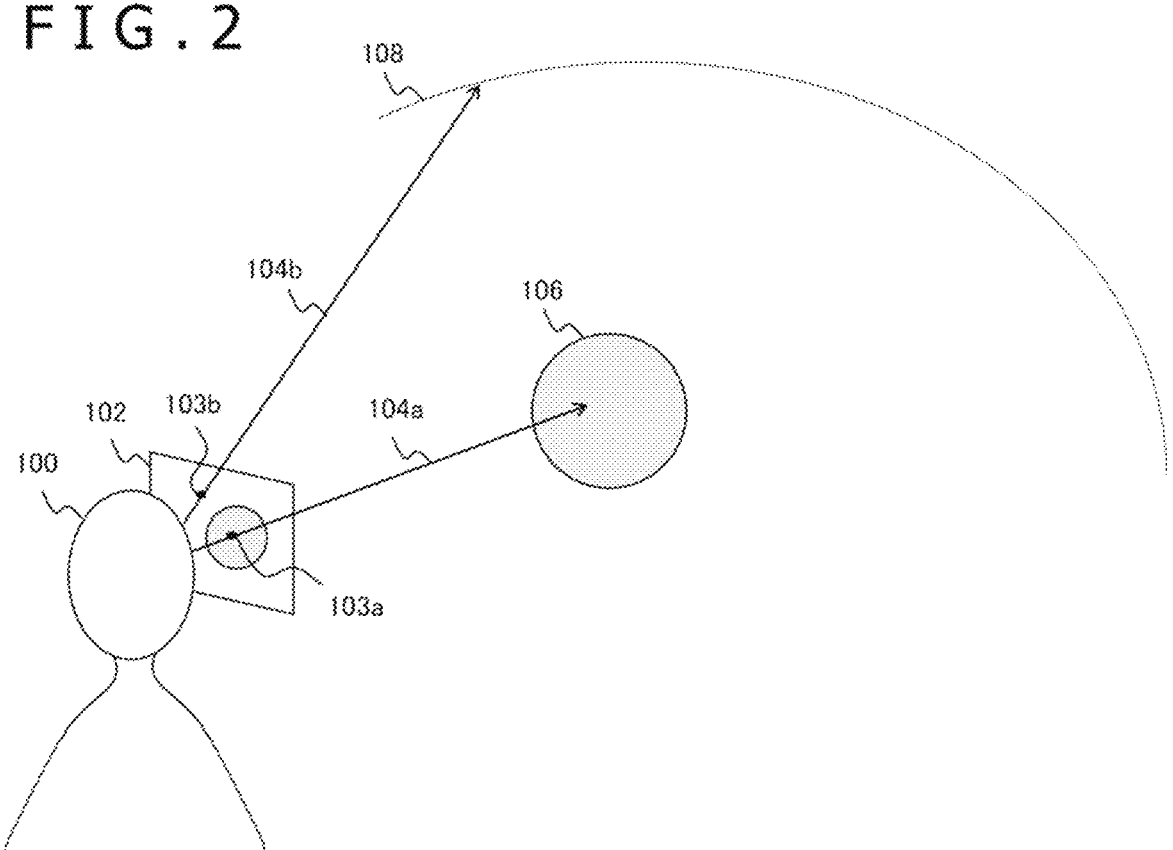
FIG. 2 is a diagram for explaining an outline of a process for rendering a display image used in the present embodiment.

FIG. 2 is a diagram for explaining an outline of a process for rendering a display image used in the present embodiment. It is assumed here that a spherical object 106, which is a simple example, is an object to be displayed. Specifically, the object 106, which is defined by a three-dimensional model, and a view screen 102 that matches the position of a viewpoint of a user 100 and the direction of the line of sight of the user 100 are placed in a world coordinate system that defines a virtual space. The display image is basically generated by projecting the object 106 and a background 108 onto the view screen 102.

When the position of the viewpoint and the direction of the line of sight are acquired at a predetermined rate according to user operations, the progression of a game, or the like and the position and orientation of the view screen 102 are changed accordingly, a moving image representing the object 106 as seen from positions various distances away and from various angles can be displayed. In the present embodiment, in particular, high-quality image representation is accomplished by using ray tracing as a base technology. The ray tracing is generally a technology of producing a ray passing from the viewpoint through each of pixels on the view screen 102, and tracing the path thereof with interactions, such as reflection, penetration, and refraction, taken into account, thereby acquiring color information of a position of arrival of the ray as a pixel value.

In the example of the figure, a ray 104a that passes through a pixel 103a arrives at the object 106, and accordingly, the pixel value of the pixel 103a is determined by acquiring the color of a point of arrival of the ray 104a. Meanwhile, a path of a ray 104b that passes through a pixel 103b does not include the object 106, and accordingly, the color of a point of arrival of the ray 104b in the background 108 is acquired as the pixel value of the pixel 103b. In actuality, however, the ray 104a may take a complicated path, as the ray 104a may be reflected by or penetrate the object 106 and reach another object, and be further reflected by or penetrate the other object.

Accordingly, real image representation that reflects the quality of objects, the surrounding environment, and so on is accomplished by, for example, solving a rendering equation with the shape and reflection property of each object, the position of a light source, and so on taken into account. Here, ray marching can be cited as a technique for increasing efficiency of the tracing of a ray until the ray reaches an object. The ray marching is a technique in which the distance from a ray to an object is acquired with use of a distance function, which is defined for each of shapes of objects, and the ray is caused to advance by the distance from the ray to the closest object, whereby the final position of arrival of the ray can be obtained.

FIG. 3 is a flowchart illustrating a procedure for determining the pixel value when the ray marching is adopted. This flowchart illustrates a procedure for determining the value of one pixel in a display image, and the illustrated procedure is repetitively performed for all pixels to render the entire display image.

First, as described above, the view screen that matches the viewpoint and the line of sight is set in a virtual space in which an object to be displayed is placed, and a ray that passes from the viewpoint through a target pixel is produced (S10). This process, in actuality, corresponds to defining the direction in which the ray will travel. Next, an object that is closest to the position of the ray (which is the viewpoint in a first iteration) is searched for in every direction (S12). The distance from the ray to an object is obtained through a distance function, which is given for each of shapes of objects.

If the distance to the closest object is not so short that the ray can be regarded as touching the object (N in S14), the ray is caused to advance by this distance (S16). If the length of a path along which the ray has traveled so far does not reach an upper limit set in advance (N in S18), an object closest to the current position of the ray is searched for (S12). Thereafter, the processes as described above are repeated as necessary, and if an object that is so close that the ray can be regarded as touching the object is detected (Y in S14), this object is determined to be the position of arrival (S20).

In a case where there is only one object as in FIG. 2, any ray that reaches the object is determined to have reached the object in a second iteration of the search. Next, the color value of a point on the object, the point being the position of arrival of the ray, is acquired (S22). The acquired color value is written into a frame buffer or the like as the pixel value of the target pixel, and is thus outputted to the display device 16 as one pixel of the display image (S24). Meanwhile, if the length of the path of the ray has reached the upper limit in S18 (Y in S18), it is determined that no object is included in the path, and the pixel value is determined with a point in the background that lies on an extension of the path being determined to be the position of arrival (S20 to S24).

For the processes as described above, in the present embodiment, first, a color map that represents a distribution of color values as acquired in S22 over the entire surface of the object is generated in advance. Thus, in S22 at the time of displaying, the color value of the point of arrival of the ray can simply be acquired from the color map. Since sufficient time can be taken to generate the color map in advance, the color map can be generated with precision through proper ray tracing.

Even complicated models, such as those of human faces, can precisely be represented through, for example, path tracing using polygon meshes. However, no particular limitations are placed on means for generating the color map, and the color map may be acquired through photographing, measurement using a sensor, or the like. Further, the color map may include not only the color values but also information regarding distributions of various types of parameters that affect color, such as a reflection coefficient. In this case, the color value obtained in S22 can be corrected according to the situation. For example, a lighting process of, for example, representing reflection of the light source according to the relation between a normal to the object surface and the ray may be carried out with use of the reflection coefficient.

Figures 4, 5:
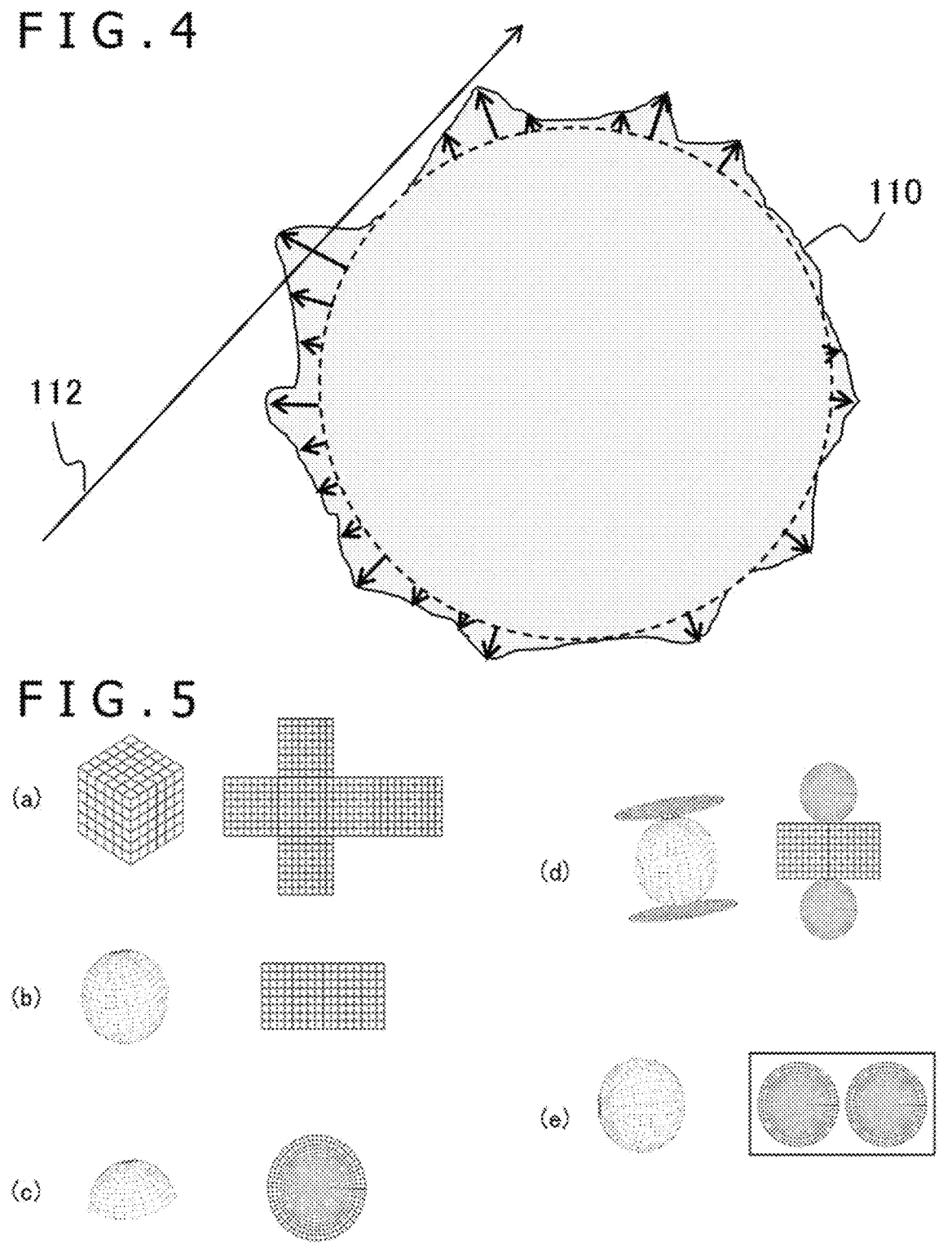

In the present embodiment, a height map that represents a distribution of differences in level of the object surface over the entire surface is further generated in advance, and is introduced when the distance between the ray and the object is acquired in S12, whereby irregularities of the object surface are represented. FIG. 4 is a diagram for explaining an effect of use of the height map on the ray tracing. In this example, the object is substantially spherical and has an uneven surface, which is illustrated in a cross-section thereof.

The height map represents a distribution of the normal height relative to a surface of a sphere that forms a base shape as represented by thick-line arrows in the figure. In a case where the height map is not taken into account, a ray 112 illustrated in the figure does not reach an object, but when an additional height is added to the surface of the sphere with use of the height map, the ray 112 reaches an object 110. Such an arrival can be detected in S12 in FIG. 3 if the distance from the ray is calculated with use of a distance function in which the height map is taken into account, which in turn leads to accurately representing the uneven surface of the object 110.

As is well known, the distance function varies depending on the base shape, such as a sphere or a cube, and accordingly, the manner for causing the height represented in the height map to be reflected in the distance function also varies depending on the type of the base shape. Therefore, the distance can be acquired in S12 in FIG. 3 with the irregularities taken into account, when a distance function with reference to a height map is prepared for each base shape in advance and the object to be displayed has associated therewith the size and type of the base shape thereof in advance.

The height map is acquired, for example, at the same time in the process of generating the color map through, for example, the path tracing using a polygon mesh as described above. Alternatively, the height map may be acquired through measurement using a sensor, photographing using a stereo camera, or the like. Also, a plurality of color maps and height maps may be generated in advance for separate points in time to represent changes in color and shape of the object. Hereinafter, the color map and the height map may sometimes be referred to collectively as "reference maps."

The reference map is originally data representing a distribution of color values or height over a surface of a solid, but access to the data is facilitated by storing the data in the form of being developed on a plane in a storage device. FIG. 5 illustrates example shapes of reference maps that can be used in the present embodiment. The left side in each of (a) to (e) represents a solid shape that is defined when a reference map is rendered, while the right side represents the solid shape developed on a plane.

When a reference map is generated, a solid that encompasses the object is first selected from simple shapes as illustrated in the figure and is defined. Then, the color values of the surface of the object or the heights relative to the base shape are obtained through, for example, the ray tracing, and the obtained values are then projected radially from, for example, a center of gravity of the object onto a surface of the solid to accomplish mapping. Basically, errors due to coordinate transformation can be minimized when a solid analogous to the shape of the object is selected for the mapping. In the case of a spherical object, for example, the values are mapped onto a spherical surface.

Part (a) represents what is generally called a cube map representing a distribution over a surface of a cube, and the cube map represents the distribution in a plane made up of six squares joined together. Part (b) represents a sphere map representing a distribution over an entire surface of a sphere, and the sphere map represents the distribution in a plane obtained through equidistant cylindrical projection. Part (c) represents a hemisphere map representing a distribution over a surface of a hemisphere, and the hemisphere map represents the distribution in a plane obtained through equidistant projection. Part (d) represents one type of sphere map, which involves combining planes obtained through equidistant cylindrical projection and equidistant projection. Part (e) also represents one type of sphere map, and each of two equal halves of a sphere is represented through equidistant projection. Note that the shapes of the solids and the planes of the maps illustrated in the figures are merely examples, and that no particular limitations are placed on the shapes of the solid and the plane of the map as long as position coordinates on the surface of the solid used when the map is rendered can be associated with two-dimensional coordinates on the development.

A technique of rendering a three-dimensional object with use of a color map and a height map of the object is disclosed in, for example, "Head Model Cubemap Distance Map," [online], Nov. 22, 2019, Shadertoy, [searched on Nov. 13, 2020]. However, a technique like this generally enables efficient processing in a case where the display target is a small-scale model, but tends to involve an increased load of processing when a complicated model or a large-scale model is to be represented accurately.

Here, a case where the sphere in FIG. 2 is the moon as an example of a large-scale model will be considered. FIG. 6 illustrates example display images when the moon is to be displayed. As illustrated in part (a), the moon is substantially spherical in a distant view thereof. Part (b) represents a view of the moon as seen from an altitude of 100 km, and irregularities due to craters are observed therein. Part (c) represents a view of the moon as seen from an altitude of 5 km, and even finer irregularities due to hills are observed therein. Such a large-scale object that allows a great change in display magnification involves a great change in appearance, and dynamic representation of such a great change can provide a sense of realism in image representation.

FIG. 7 illustrates examples of reference maps that can be used when the moon as illustrated in FIG. 6 is represented. Parts (a) and (b) represent a color map and a height map, respectively, which are assumed to represent distributions of color values and height, respectively, of the spherical surface in a plane having a width of 16000 pixels and a height of 8000 pixels through equidistant cylindrical projection. Since the circumference of the moon is approximately 10921 km, each pixel represents information of 0.68 km in the vicinity of the equator.

That is, use of such maps makes it possible to represent the color and irregularities in units of several hundred meters. Meanwhile, a large-scale model, such as that of the moon, involves a great change in magnification when the view is changed from a distant view to a short-range view or vice versa, and using a detailed map to represent the distant view is not efficient. Accordingly, in the present embodiment, color maps and height maps having a plurality of resolutions are prepared, and maps to be used are switched according to the level of detail required for the display. This makes it possible to accomplish high-quality image representation with a substantially equal load of processing regardless of the magnification.

Figure 8:
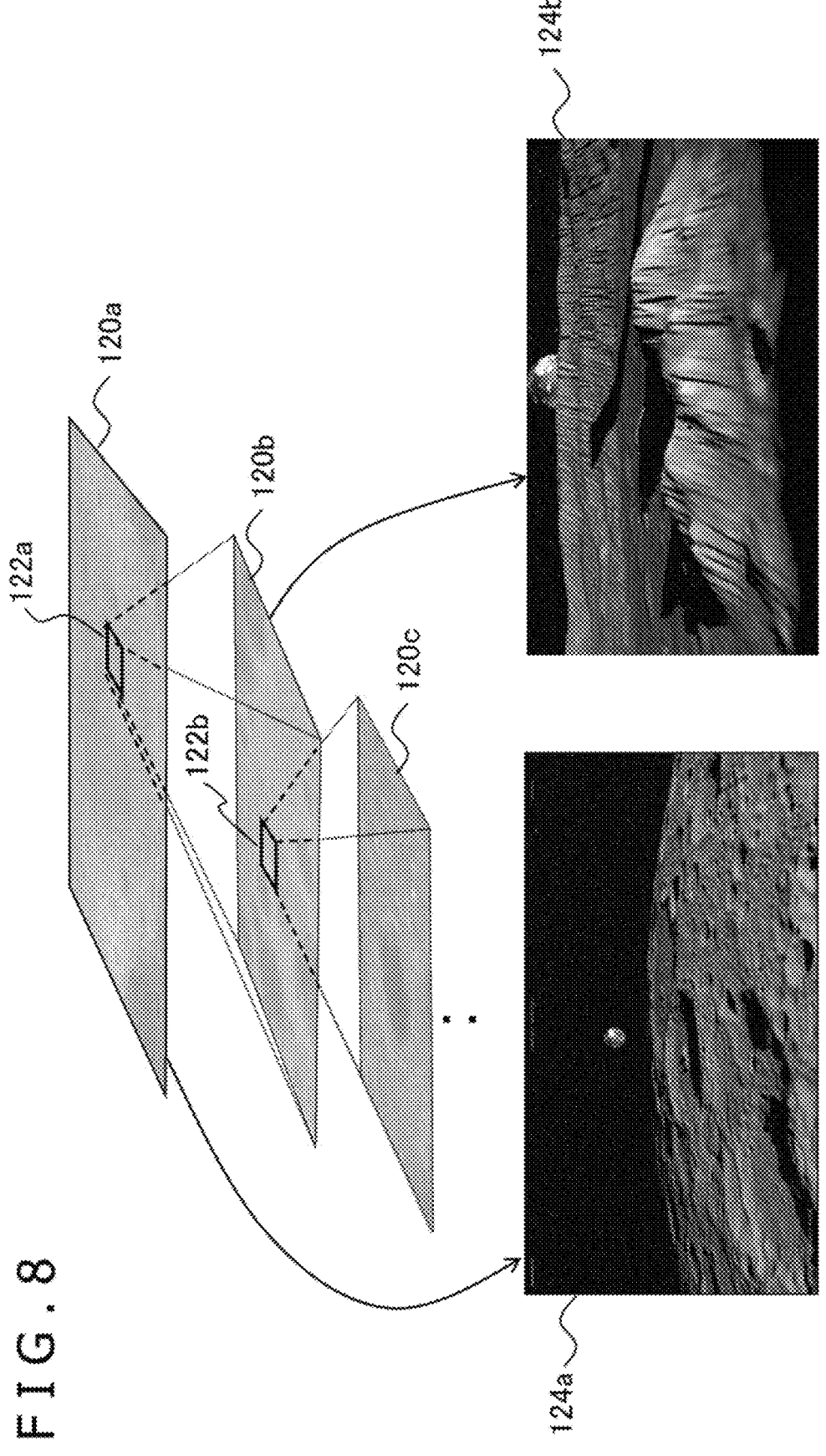
FIG. 8 is a diagram for explaining the relations between display images and data of reference maps having a plurality of resolutions in the present embodiment.

FIG. 8 is a diagram for explaining the relations between the display images and data of reference maps having a plurality of resolutions. Here, a height map 120a represents a distribution of the height over the entire lunar surface as illustrated in part (b) of FIG. 7. A height map 120b represents the height of the lunar surface in a partial region 122a of the height map 120a in a resolution higher than that of the height map 120a. A height map 120c represents the height of the lunar surface in a partial region 122b of the height map 120b in a resolution higher than that of the height map 120b.

The image processing device 10, for example, renders an image 124a of the moon as seen from an altitude of 100 km, by using the height map 120a having a minimum resolution and a color map having the same resolution. Further, the image processing device 10 renders an image 124b of the moon as seen from an altitude of 5 km, by using the height map 120b having a resolution increased by one step and a color map having the same resolution. Such a switch of the references makes it possible to render images with a substantially equal amount of processing regardless of the magnification.

Note that, although the height maps illustrated in the figure represent smaller regions as the resolution increases, this configuration should not be construed as limiting the present embodiment. For example, in a case where there is a need to make every point on the object viewable in a magnified form, reference maps covering the entire surface are prepared regardless of the resolution. Meanwhile, in a case where only partial regions of the object need to be magnified, reference maps having a high resolution may be prepared only with respect to the partial regions as illustrated in the figure, to achieve a reduction in the amount of data.

Figures 9, 10:
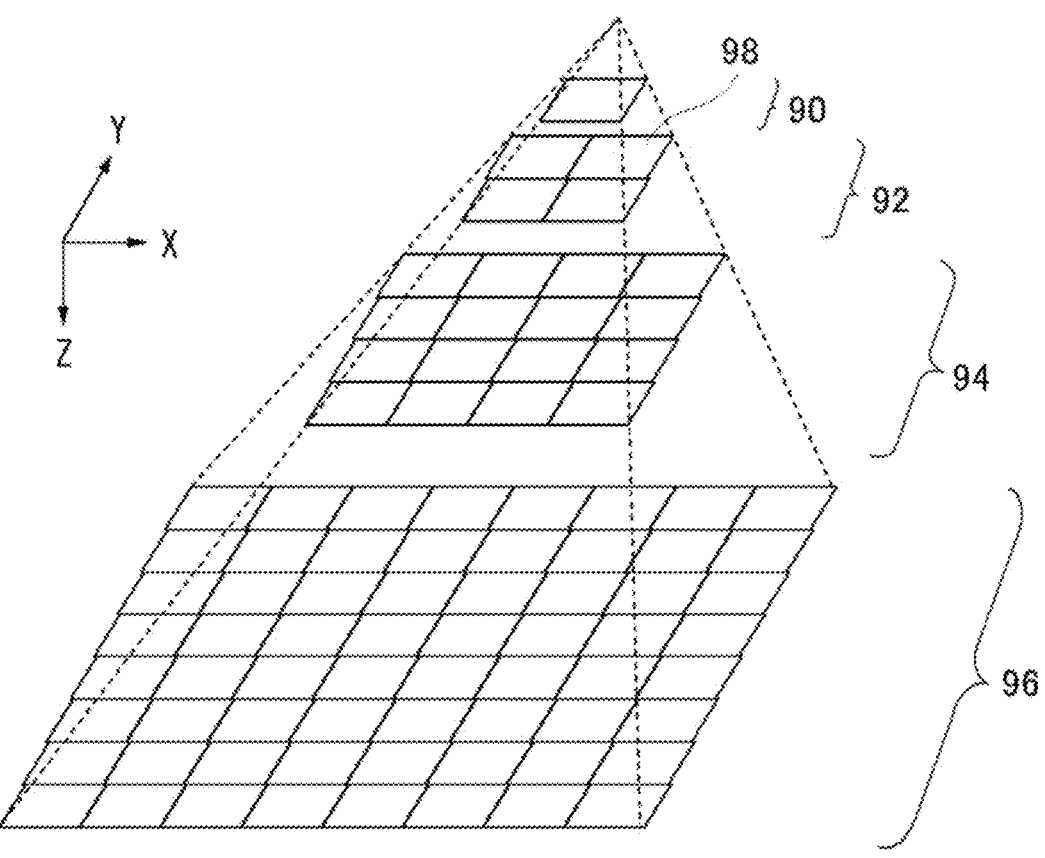
FIG. 9 is a schematic diagram of a data structure of a reference map used in the present embodiment.
FIG. 10 is a diagram illustrating an internal circuit configuration of an image processing device according to the present embodiment.

FIG. 9 is a schematic diagram of a data structure of a reference map used in the present embodiment. Data of the reference map has a hierarchical structure having a zeroth layer 90, a first layer 92, a second layer 94, and a third layer 96 arranged in the depth (Z-axis) direction. Note that, although only four layers are illustrated in this figure, the number of layers is not limited to four. Hereinafter, data having such a hierarchical structure will be referred to as "hierarchical data."

The hierarchical data illustrated in FIG. 9 has a quadtree hierarchical structure, and each layer includes one or more tile regions 98. All of the tile regions 98 are formed to have the same size and the same number of pixels, which are, for example, 256×256 pixels. Here, the term "pixel" refers to a unit region with which one color value or height is associated on a map. Data of each layer represents one reference map in a different resolution, and the reference map of the third layer 96, which has a maximum resolution, is reduced in a plurality of stages to generate pieces of data of the second layer 94, the first layer 92, and the zeroth layer 90. The resolution of an Nth layer (where N is an integer equal to or greater than 0) may be, for example, a half of the resolution of an (N+1)th layer in each of the horizontal (X-axis) direction and the vertical (Y-axis) direction.

The hierarchical data is stored, in the state of being compressed in a given compression format, in a hard disk drive in the image processing device 10, a storage device of the content server 20, or the like. The image processing device 10 determines the level of detail required for the display of the object according to the change in the viewpoint, etc., reads data of tile regions in the layer corresponding thereto required for rendering, decodes the data, and develops the data in an internal memory. As illustrated in the figure, the hierarchical data is defined in a virtual three-dimensional space in which the plane of the reference map represented in the same resolution is expressed with X and Y coordinates, and the resolution is expressed with a Z-coordinate.

FIG. 10 illustrates an internal circuit configuration of the image processing device 10. The image processing device 10 includes a CPU (Central Processing Unit) 22, a GPU (Graphics Processing Unit) 24, and a main memory 26. These components are connected to one another via a bus 30. Further, an input/output interface 28 is connected to the bus 30. To the input/output interface 28 are connected a communication section 32, which includes a peripheral device interface such as a USB (Universal Serial Bus) or IEEE (Institute of Electrical and Electronics Engineers) 1394 interface or a wired or wireless LAN network interface, a storage section 34 such as a hard disk drive or a non-volatile memory, an output section 36 that outputs data to the display device 16, an input section 38 that accepts input of data from the input device 14, and a recording medium driving section 40 that drives a removable recording medium such as a magnetic disk, an optical disk, or a semiconductor memory.

The CPU 22 controls the whole of the image processing device 10 by executing an operating system stored in the storage section 34. The CPU 22 also executes various types of programs, which may be read from the removable recording medium and loaded into the main memory 26, or be downloaded via the communication section 32. The GPU 24 has a function of a geometry engine and a function of a rendering processor, performs a rendering process according to a rendering instruction from the CPU 22, and stores a resulting display image in a frame buffer, which is not illustrated. Then, the display image stored in the frame buffer is converted to a video signal, and is outputted to the output section 36. The main memory 26 includes a RAM (Random Access Memory), and stores data and a program required for processing.

Figure 11:
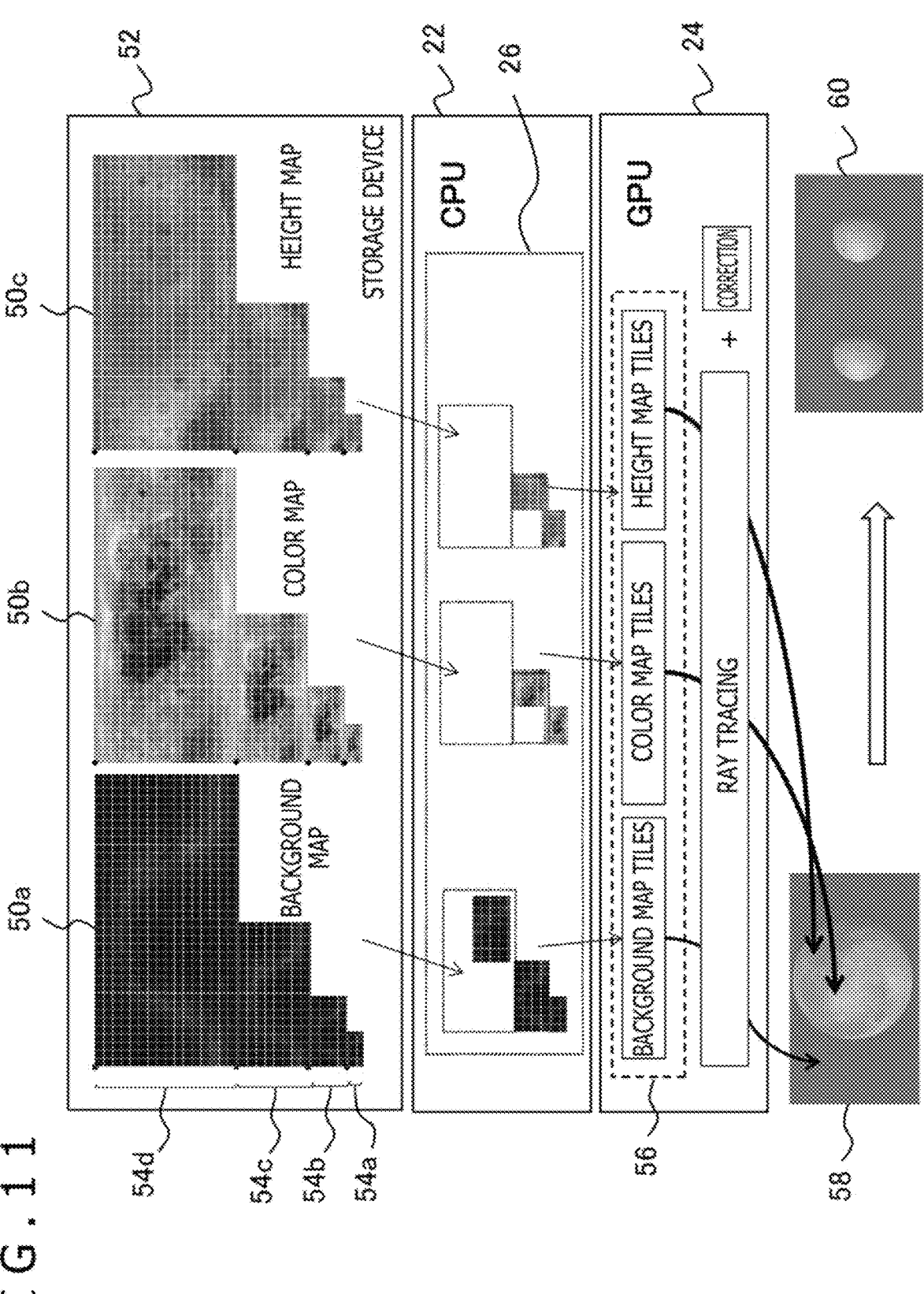
FIG. 11 is a diagram schematically illustrating flows of data in the present embodiment.

FIG. 11 schematically illustrates flows of data in the present embodiment. First, hierarchical data of each of reference maps 50a, 50b, and 50c is stored in the storage section 34 in the image processing device 10, a recording medium mounted on the recording medium driving section 40, or a storage device 52 of, for example, the content server 20, with which the image processing device 10 is connected via the network 8. In this example, the reference maps are made up of a background map (i.e., the reference map 50a) representing the outer space, a color map (i.e., the reference map 50b) of the moon, and a height map (i.e., the reference map 50c) of the moon.

In this example, each of the reference maps 50a, 50b, and 50c has a four-layer structure having a zeroth layer having a minimum resolution, first and second layers, and a third layer having a maximum resolution (e.g., a zeroth layer 54a, a first layer 54b, a second layer 54c, and a third layer 54d of the background map). The reference map of each layer is compression-encoded by a common method, such as JPEG (Joint Photographic Experts Group) or PNG (Portable Network Graphics).

The image processing device 10 loads some portions of the data of the reference maps 50a, 50b, and 50c, in the state of being compression-encoded, into the main memory 26. The data to be loaded here is determined according to the viewpoint and the line of sight for the object to be displayed. Specifically, in the three-dimensional space of the hierarchical data illustrated in FIG. 9, the Z-coordinate is determined on the basis of the level of detail determined according to the distance from the viewpoint to the object, and the ranges of X-coordinates and Y-coordinates are determined in such a manner as to include tile data of a region corresponding to a display region determined on the basis of the viewpoint and the line of sight.

Note that pieces of tile data that will be required later may be predicted on the basis of, for example, histories of the changes in the viewpoint and the line of sight up to the present, and be loaded into the main memory 26. In the figure, to represent the fact that portions of the reference maps 50a, 50b, and 50c have been loaded, tiles of only a loaded portion of a rectangle representing the plane of the reference map of each layer are illustrated.

A loading process may be performed when a new piece of data is required according to the movement of the viewpoint and/or the line of sight, or may be performed, for example, at predetermined time intervals when necessary. This leads to preventing loading processes from being performed concentratedly in one period of time. In addition, the loading may be performed in units of blocks each made up of a plurality of tile regions. In this case, each of the reference maps 50a, 50b, and 50c is divided into blocks according to a predetermined rule. At this time, each block may be made up of pieces of tile data in the same layer, or may include pieces of tile data in a plurality of layers.

Efficient data management in the main memory 26 is made possible when the blocks are arranged to have substantially the same data size, for example. That is, even when the tile data has been subjected to variable-length compression, a substantial equalization of the data size of the blocks is possible. Thus, new data loading is completed by overwriting any of the blocks already stored in the main memory 26. Accordingly, fragmentation does not easily occur, efficient use of the memory is possible, and address administration is made easier.

Next, out of the compression-encoded data of the reference maps stored in the main memory 26, tile data of a region required for rendering the display image or tile data of a region that is predicted to be required is decoded and decompressed, and is stored in a memory 56 in the GPU 24. Tile data of a range larger than that of the currently required reference map may be developed in the memory 56 to make it possible to instantly cope with any reasonable movement of the viewpoint and/or the line of sight. At this time, tile data of a different layer may also be developed to make it possible to easily cope with a change in the distance between the viewpoint and the object.

By using the tile data stored in the memory 56, the GPU 24 of the image processing device 10 renders a display image 58 according to the procedure as illustrated in FIG. 3. In this example, a pixel region with respect to which the ray reaches the object of the moon is identified with use of the height map, and an image of the moon is rendered with use of the color map. In a pixel region with respect to which the ray does not reach the object of the moon, the outer space is rendered with use of the background map. In a case where the display device 16 is a head-mounted display, the GPU 24 generates a left-eye image and a right-eye image equivalent to the display image 58, and performs correction of adding opposite distortions thereto such that the image can be viewed without distortion through an eye lens.

Then, in a case where the display device 16 is a flat-panel display, the display image 58 is outputted without being corrected, while in a case where the display device 16 is a head-mounted display, a display image 60 obtained after the correction is outputted. During this process, as often as necessary, the image processing device 10 loads and decodes other pieces of tile data as necessary. This technique is able to achieve a significant reduction in required memory capacity when compared to a case where the whole hierarchical data of the original reference maps 50a, 50b, and 50c is developed in the memory. Accordingly, without use of a high-capacity external memory, efficient memory access in the GPU is possible, enabling high-speed rendering.

FIG. 12 illustrates functional blocks of the image processing device 10. The image processing device 10 includes an input information acquisition section 70 that acquires the contents of a user operation, a target data determination section 72 that determines the layer and the region of the reference map required for rendering, a tile data acquisition section 74 that acquires tile data of the reference map, and a compressed data storage section 76 that stores the acquired tile data. The image processing device 10 further includes a decoding/decompression section 78 that decodes and decompresses the tile data, a tile data storage section 80 that stores the tile data after being decoded and decompressed, a rendering section 82 that renders a display image by using the tile data, and an output section 84 that outputs data of the display image to the display device 16.

The components depicted as the functional blocks that perform various processes in FIG. 12 can be implemented in hardware by the CPU 22, the GPU 24, the main memory 26, and other LSI (Large-Scale Integration) circuits as illustrated in FIGS. 10 and 11, and can be implemented in software by a program that implements a communication function, an image processing function, various computation functions, etc., the program being loaded into the main memory 26. Therefore, it will be understood by those skilled in the art that these functional blocks can be implemented in various forms in hardware alone, in software alone, or in a combination of hardware and software, and the functional blocks may be implemented in any of such forms.

The input information acquisition section 70 is implemented by the input section 38, the CPU 22, etc., illustrated in FIG. 10, and acquires the contents of the user operation through the input device 14. Conceivable examples of the contents of the user operation include selection of an object to be displayed or electronic content, movement of the viewpoint and/or the line of sight toward an object to be displayed, and input of any of various commands with respect to electronic content. In the present embodiment, a focus is placed, in particular, on an operation of moving the viewpoint and/or the line of sight with respect to the object to be displayed. The viewpoint and the line of sight may be operated directly by a user, or may alternatively be caused to change as a result of processing of content, such as a computerized game. In the latter case, the input information acquisition section 70 may acquire information related to the movement of the viewpoint and/or the line of sight from a content processing function, which is not illustrated.

The target data determination section 72 is implemented by the CPU 22 or the like illustrated in FIG. 10, and determines the tile data of the reference map required for rendering the display image. Specifically, in the three-dimensional space of the hierarchical data as illustrated in FIG. 9, the target data determination section 72 determines the Z-coordinate according to the distance from the viewpoint to the object, and determines the range on an X-Y plane according to the position of the viewpoint and the direction of the line of sight. Then, tile data covering the corresponding range on the X-Y plane of the layer that is closest to the determined Z-coordinate is identified.

As mentioned above, the target data determination section 72 may predict the required tile data according to the movements of the viewpoint and the line of sight up to the present. Further, in a case where the object itself is moving, the target data determination section 72 may determine the required tile data on the basis of the movement thereof as well. The target data determination section 72 provides the determined information to the tile data acquisition section 74 and the decoding/decompression section 78.

The tile data acquisition section 74 is implemented by the CPU 22, the communication section 32, the storage section 34, the recording medium driving section 40, etc., illustrated in FIG. 10, and loads, from a storage device included in the image processing device 10, the content server 20, or the like, the tile data required for rendering and surrounding tile data that has not been acquired yet. The source of this loading corresponds to the storage device 52 in FIG. 11. The data loaded here is in the state of being compression-encoded, and the tile data acquisition section 74 stores this data in the compressed data storage section 76.

The compressed data storage section 76 is implemented by the main memory 26 or the like illustrated in FIGS. 10 and 11. As mentioned above, the tile data acquisition section 74 loads the data in units of blocks, which are obtained by dividing the hierarchical data of the reference map according to the predetermined rule, to accomplish efficient use of a storage region of the compressed data storage section 76 and high-speed memory access. The decoding/decompression section 78 is implemented by the CPU 22, the GPU 24, or the like illustrated in FIG. 10, decodes and decompresses required data in the tile data stored in the compressed data storage section 76, and stores the resulting data in the tile data storage section 80.

The tile data storage section 80 is the internal memory of the GPU 24 illustrated in FIGS. 10 and 11 or a memory accessible by the GPU 24, and corresponds to the memory 56 in FIG. 11. In the tile data storage section 80, the tile data of the reference map currently required for rendering the display image and tile data of a predetermined surrounding range are stored. The required tile data is updated when necessary according to the movements of the viewpoint and the line of sight relative to the object, and the data developed in the tile data storage section 80 also changes. The rendering section 82 is implemented by the GPU 24 or the like illustrated in FIGS. 10 and 11, and renders the display image by using the tile data of the reference map developed in the tile data storage section 80.

Specifically, a view screen that matches the current viewpoint and line of sight is set, and a ray is produced with respect to each pixel to determine the pixel value thereof as illustrated in FIG. 3. Note that, when the color value or the value of height is acquired from the reference map, the range on the map which corresponds to each pixel region on the view screen is identified, and filtering of data of this range is performed. That is, the coverage rate of the pixels on the view screen is calculated with use of a partial differential function with respect to the pixels on the surface of the solid representing the reference map as illustrated in FIG. 5.

Then, one value is determined by, for example, weighted averaging of the values, i.e., color values or heights, of those pixels on the map which include a predetermined proportion or more of the pixel region on the view screen. When the final pixel value is determined, the rendering section 82 may, for example, carry out a lighting process to correct the color value as described above. The rendering section 82 stores the determined pixel value in the frame buffer, which is not illustrated. The rendering section 82 may further correct the image as necessary, as illustrated in FIG. 11. The output section 84 is implemented by the output section 36 or the like illustrated in FIG. 10, and outputs, as a video signal, the data of the display image written to the frame buffer to the display device 16 at an appropriate timing.

Figure 13:
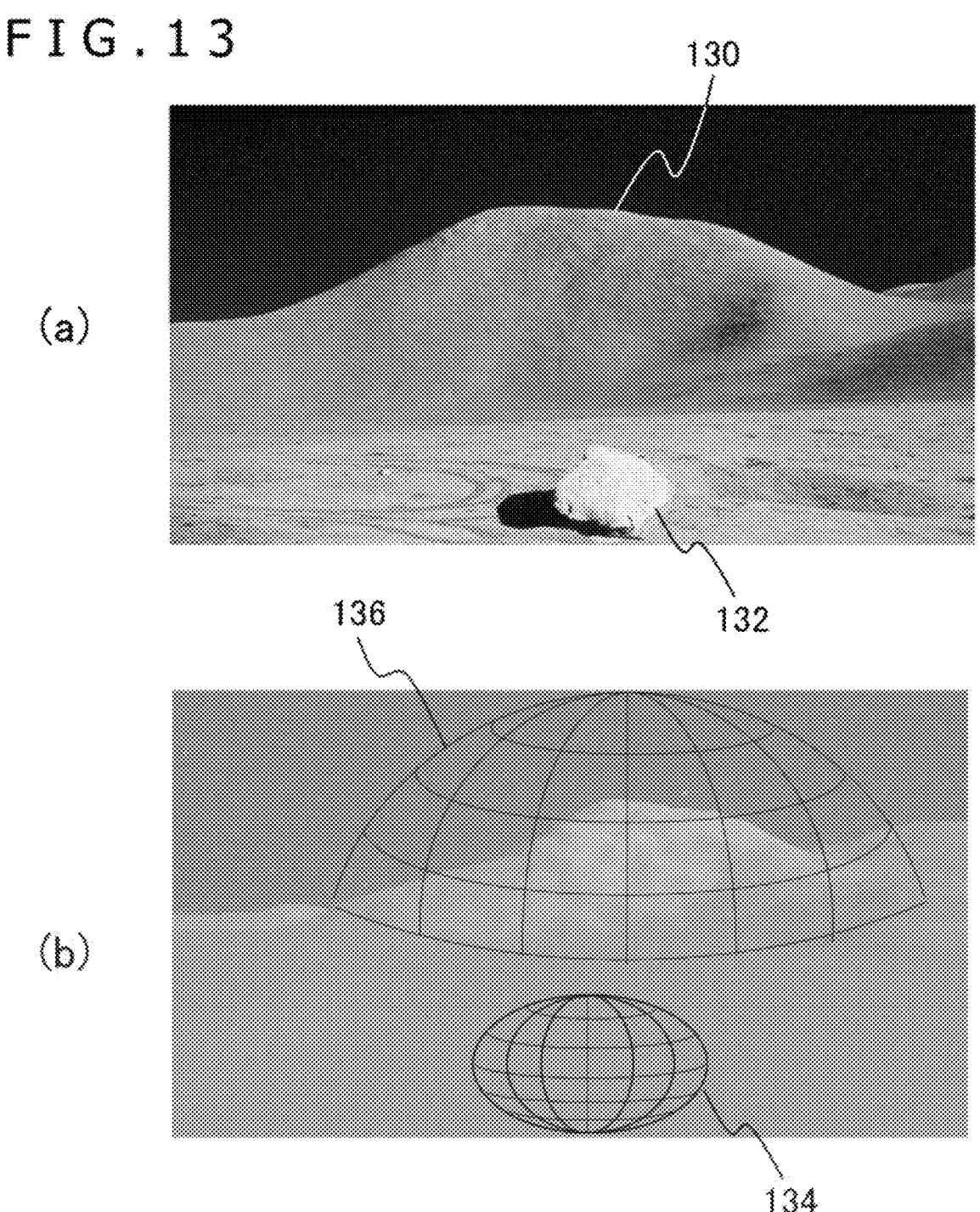
FIG. 13 illustrates diagrams for explaining a mode in which a plurality of reference maps are prepared for one three-dimensional object in the present embodiment.

In the example mode described above, only one color map and only one height map are prepared for each three-dimensional object to be displayed. Meanwhile, one three-dimensional object may be divided into a plurality of parts, and a color map and a height map may be prepared for each part, to efficiently increase the level of detail and precision of the image. FIG. 13 illustrates diagrams for explaining a mode in which a plurality of reference maps are prepared for one three-dimensional object. It is assumed here that the three-dimensional object to be displayed is the moon as in FIG. 6.

Part (a) illustrates an example of a display image when the viewpoint has come closer to the lunar surface beyond an altitude of 5 km as illustrated in part (c) of FIG. 6 and has reached the vicinity of the lunar surface. It is assumed here that not only a hill 130, which is illustrated also in part (c) of FIG. 6, but also a rock 132 is easily visually recognizable. As illustrated in FIG. 4, the height map defines the normal height of a surface of a solid that forms a base shape, such as the sphere, and therefore, the hill 130, which is a simple bulge projecting in the heightwise direction, can be represented by the height map. Meanwhile, a portion, such as the rock 132, which partially touches the solid that forms the base shape, or which is joined to the solid but a bottom surface of which is partially apart from the surface of the solid that forms the base shape cannot be fully represented by the height map.

For example, such forms as the sphere, an object that juts in the lateral direction, and a tunnel have an element other than the height relative to the lunar surface, and, therefore, cannot be accurately represented by the height map. Accordingly, in the present embodiment, reference maps are prepared for individual parts of even one three-dimensional object to increase the flexibility of the direction of the height represented by the height maps. In the illustrated example, as illustrated in part (b), reference maps for representing a three-dimensional object of the rock 132 and model data 134 representing a base shape, size, etc., thereof are prepared separately from data of the moon.

The shape of the rock 132 is visually recognizable only when the viewpoint is close enough thereto, and it is therefore preferable that whether or not the model data 134 is to be used together be determined depending on the distance from the viewpoint. For example, in the case of a distant view as illustrated in FIG. 6, the reference maps of the moon alone are used to render the display image, and in a case where the viewpoint is close as illustrated in FIG. 13, the reference maps and model data 134 of the rock 132 are read out and incorporated into the rendering process.

Specifically, the base shape of the rock 132 is placed on the lunar surface, the height map thereof is used to identify the pixels with respect to which the ray reaches the rock 132, and the pixel values of these pixels are determined with reference to the color map of the rock. Such a process enables increased reality of representation of the state of the rock 132 as seen at close range. Note that model data 136 representing a base shape, the position, etc., and reference maps may be similarly prepared with respect to the hill 130 as well to enable more detailed representation thereof than can be possible with the data of the moon as a whole. Well-known computation of a CSG (Constructive Solid Geometry) model can be used for a combination of base shapes.

FIG. 14 represents examples of reference maps that are prepared in a mode in which a plurality of pieces of model data are used in combination. Assuming that the moon is to be displayed as in the case of FIG. 13, a height map 142 with respect to the lunar surface as a whole and a corresponding color map are first prepared. Further, the model data 134 for the rock and the model data 136 for the hill illustrated in FIG. 13 are prepared. Specifically, a height map 140 and a corresponding color map are prepared to be associated with the base shape (i.e., a sphere in the figure) representing the rock and the size and position thereof. Further, a height map 138 and a corresponding color map are prepared to be associated with the base shape (i.e., a hemisphere in the figure) representing the hill and the size and position thereof.

Figure 15:
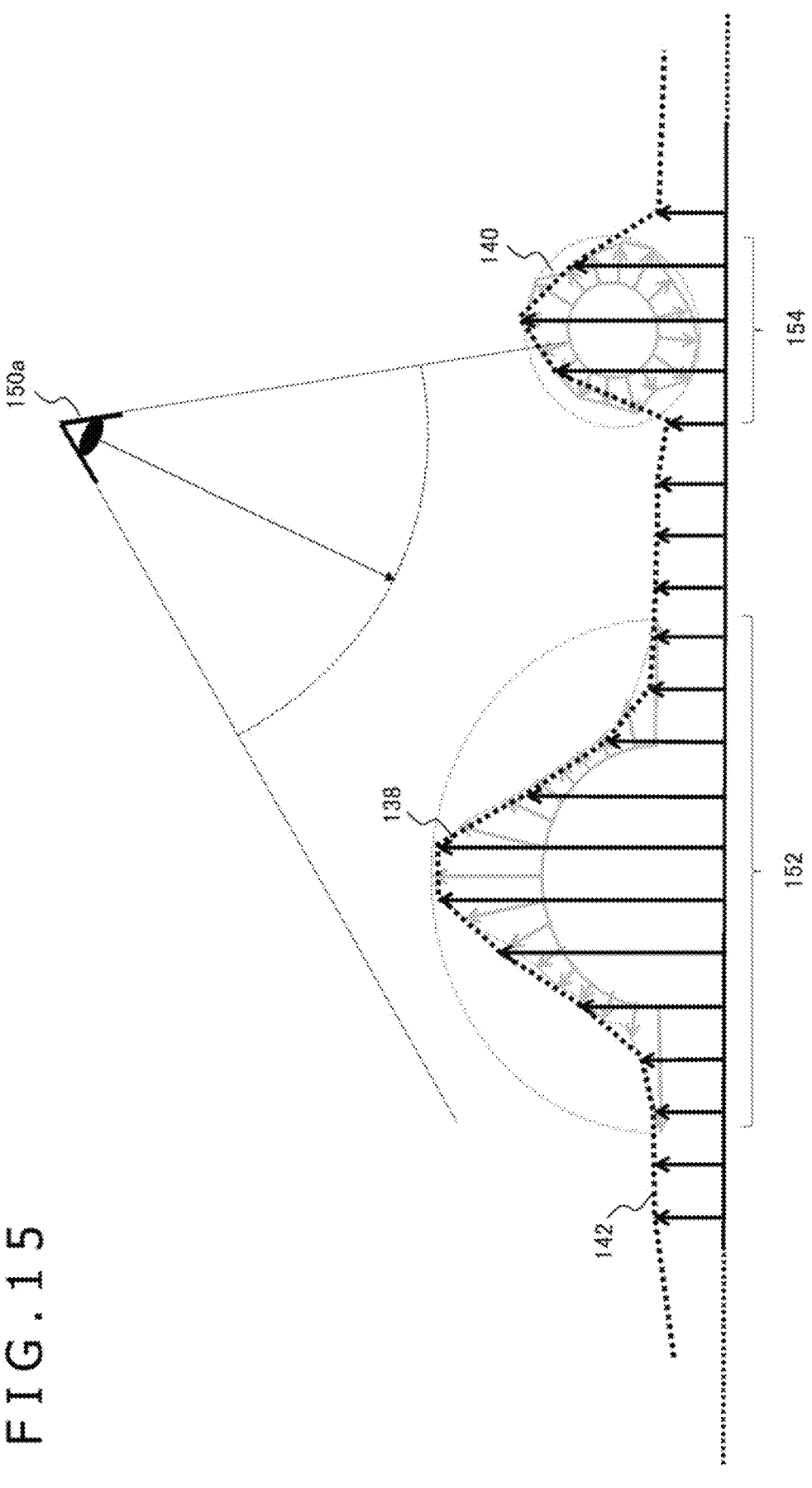
FIG. 15 is a diagram for explaining switching of the reference maps according to the change in the viewpoint in the mode in which a plurality of pieces of model data are used in combination in the present embodiment.
Figure 16:
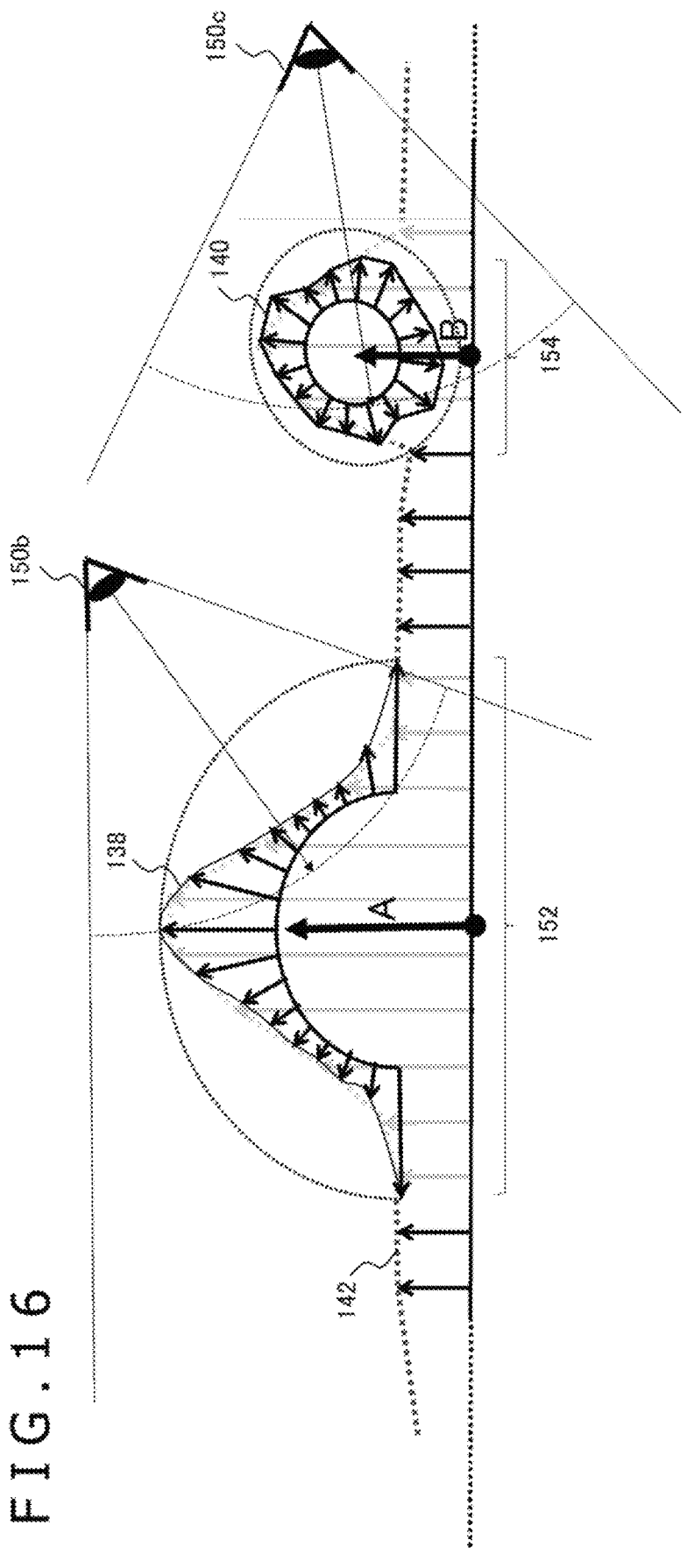
FIG. 16 is a diagram for explaining switching of the reference maps according to the change in the viewpoint in the mode in which a plurality of pieces of model data are used in combination in the present embodiment.

FIGS. 15 and 16 are diagrams for explaining switching of the reference maps according to the change in the viewpoint in the mode in which a plurality of pieces of model data are used in combination. In a case where the pieces of model data for the hill and the rock are prepared separately as illustrated in FIG. 14, the height maps 138 and 140 for a hill 152 and a region 154 of the rock, respectively, are set to overlap with the height map 142 for the lunar surface at the hill 152 and the region 154 of the rock.

Here, as illustrated in FIG. 15, in a case where a viewpoint 150*a* is at a predetermined distance or more from the lunar surface, the display image is rendered with effective use of the height map 142 for the lunar surface and the corresponding color map. In the figure, the height maps 138 and 140 prepared separately are depicted in thin lines to indicate that the height maps 138 and 140 are ineffective. Even in this case, as illustrated in FIG. 6, the irregularities of the surface can be dynamically represented according to the approach of the viewpoint through use of the hierarchical structure.

Meanwhile, as illustrated in FIG. 16, when a viewpoint 150*b* is at a distance of less than a threshold value from the hill 152, the display image is rendered with effective use of the height map 138 for the hill and the corresponding color map. In practice, the rendering section 82 positions the model of the hill by referring to the data representing the base shape of the hill and the position, size, etc., thereof, and then refers to the above reference maps in ray tracing.

In a case where a viewpoint 150*c* is at a distance of less than a threshold value from the region 154 of the rock, similarly, the model of the rock is positioned, and the display image is rendered with use of the height map 140 and the corresponding color map. In the figure, portions of the height map 142 for the lunar surface which correspond to the hill 152 and the region 154 of the rock are depicted in thin lines to indicate that these portions are ineffective. Thus, the hill and the rock can be represented more precisely than in a case where the height map 142 for the lunar surface alone is used. For example, a gap between the lunar surface and the rock can be accurately represented when the rock is viewed laterally from the viewpoint 150c.

In the present embodiment, the hierarchical structure of the reference maps enables seamless representation even when a great change in magnification occurs, but an increase in the maximum resolution would result in a corresponding increase in data size and more time to be taken for data access in the loading process. Accordingly, the maximum resolution of the reference maps for the moon as a whole is limited to some extent, and reference maps having higher resolutions are locally prepared for the hill, the rock, etc., as necessary, so that a reduction in the data size and increased efficiency in processing with maintained quality can be achieved.

Hereinafter, a model that serves as a base for representing a whole three-dimensional object to be displayed, such as the moon, will be referred to as a "base model," and a partial model of, for example, a rock, a hill, or the like, which is combined with the base model, will be referred to as a "part model." A reference map of a part model may be prepared with only one resolution, or alternatively, hierarchical data of a reference map of a part model with a plurality of resolutions may be prepared as is the case with the base model. Here, it is convenient to define, in the three-dimensional space representing the hierarchical structure of the reference map of the base model, the distance of the viewpoint which prompts a switch to a part model, and the region at which the switch is made. In FIG. 16, such switches are represented by arrows A and B.

FIG. 17 is a diagram for explaining a technique of defining a switch between a base model and a part model. Three triangles in the figure represent hierarchical data 160 of a reference map of the base model and pieces of hierarchical data 162a and 162b of reference maps of two part models. In actuality, the pieces of hierarchical data 160, 162a, and 162b each have a structure, as illustrated in FIG. 9, in which reference maps having different resolutions exist discretely in a Z-axis direction of the figure.

As the viewpoint moves closer to the object, the target data determination section 72 moves the required resolution in the Z-axis direction of the figure. When the viewpoint and/or the line of sight move while keeping the same distance, the target data determination section 72 moves the range of required data horizontally in the figure. It is assumed that, in the three-dimensional space of the hierarchical data as described above, the hierarchical data 160 of the base model and the pieces of hierarchical data 162a and 162b of the part models overlap with one another as illustrated in the figure.

Here, if the viewpoint moves closer to the object as indicated by an arrow a while the display image is rendered with use of the hierarchical data 160 of the base model, the hierarchical data 162a of the part model comes to be included in the required data. As a result, the target data determination section 72 switches the data of the reference map required with respect to a relevant portion from data of the hierarchical data 160 of the base model to data of the hierarchical data 162a of the part model.

As a result of the movement of the viewpoint as indicated by the arrow a, a small portion of the display image rendered with use of the reference map of the base model is replaced with an image rendered with use of a reference map of the part model which has a relatively low resolution. If the viewpoint further approaches so much that the required resolution moves in the Z-axis direction, a large portion of the display image will be rendered with use of a reference map of the part model which has a high resolution. Further, if the viewpoint moves in the direction opposite to the direction indicated by the arrow a, the display image will eventually be rendered with use of the reference map of the base model alone.

The resolution and the region at which a switch of the reference to a reference map of another model is prompted in connection with the object being displayed are set in advance as "link information," which is represented by a line 164 in the figure. In the example of the figure, a switch from the hierarchical data 160 to the hierarchical data 162a is made at a resolution corresponding to z1 along the Z-axis and a region on an X-Y plane (see FIG. 9) represented by the line 164. Hereinafter, such a switch of the reference map will be referred to as a "link." There is no limitation on the number of part models with respect to which links are set in the hierarchical data 160 of the base model.

Moreover, the hierarchical data 162a of the part model may have a link to yet another part model set therein. As mentioned above, information required for rendering, such as the base shape and the size, is associated with each of the pieces of hierarchical data 160, 162a, and 162b. Accordingly, the rendering section 82 is able to render display images while switching the reference maps as necessary according to a procedure similar to the procedure illustrated in FIG. 3. Note that a similar link structure can be adopted even in a case where the reference map of the part model does not have the hierarchical structure as described above.

In the example illustrated in the figure, a link structure in which the reference maps of the same type are associated with each other is adopted, but pieces of data of different types may be associated with each other according to a similar principle. For example, in place of the reference map of the part model, model data of a different type for rendering the part model may be associated with the other data. For example, on the assumption that the part model is represented with use of a procedural model, computational expressions, etc., for representation using this model may be set to be associated with the link information of the line 164. This makes it possible to, when the display magnification of the three-dimensional object that is being rendered through ray tracing using the reference maps has reached a predetermined value, flexibly switch the technique of representation to a model suited to the properties of a magnified portion.

Alternatively, a moving image may be associated with the link information to provide a representation of a magnified portion starting to move when the display magnification has reached a predetermined value. In addition, changes in a parameter other than the resolution may be given to pieces of data represented by layers of even one reference map. For example, a higher reflection coefficient may be set in a color map of a layer having a higher resolution to represent strong reflected light or emphasize the third dimension when the image is magnified. Data adjustment of the reference maps according to the layers is not limited to this example. Changes in the color value or height itself may be given. This will make it possible to represent the object such that the color or shape thereof will change according to the distance of the viewpoint. The changes due to the layers may be given to either one or both of the color map and the height map.

Figure 18:
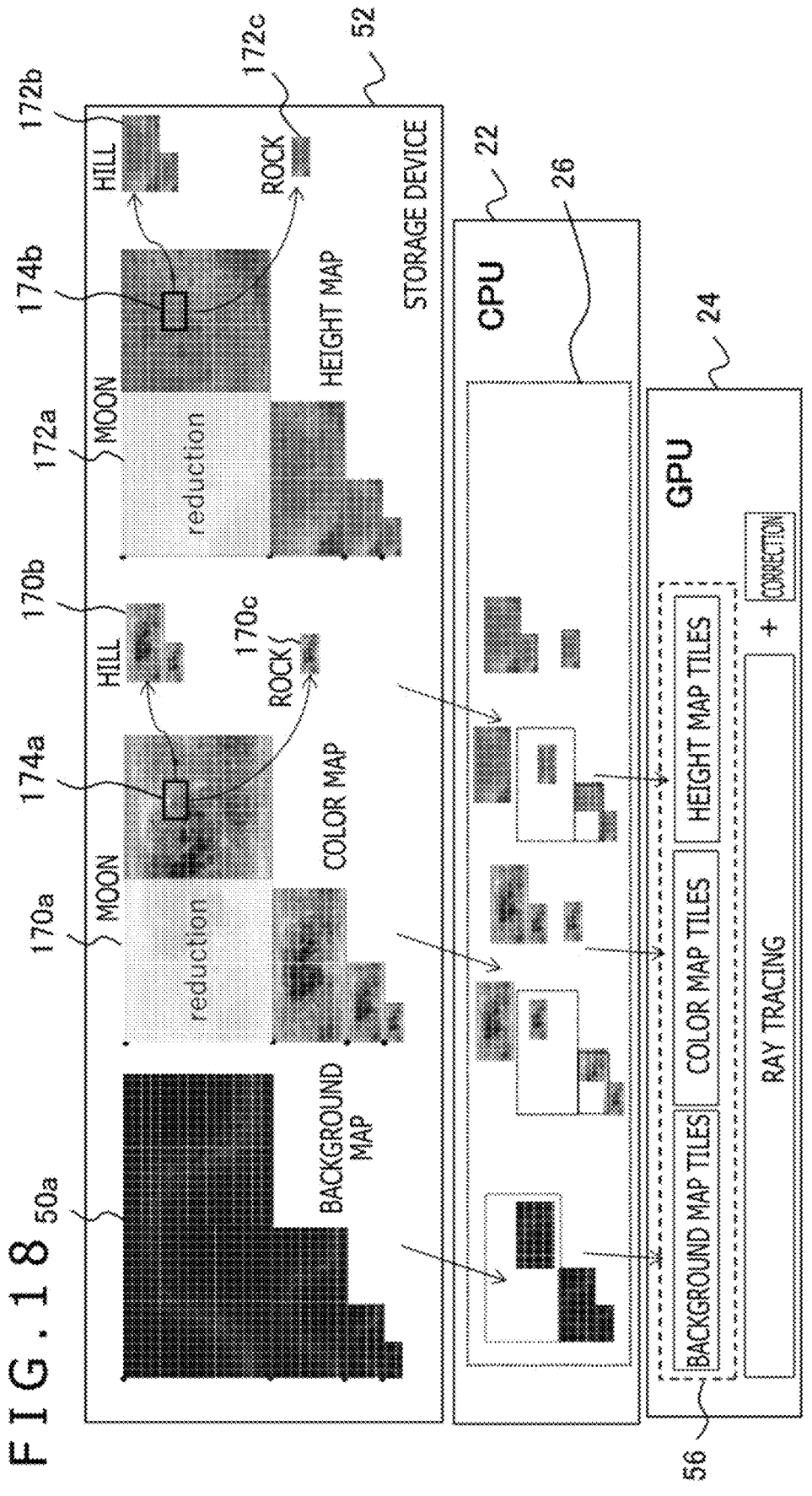
FIG. 18 is a diagram schematically illustrating flows of data in a mode in which part models are incorporated in the present embodiment.

FIG. 18 schematically illustrates flows of data in a mode in which part models are incorporated. The flows of data are substantially similar to those illustrated in FIG. 11, and a focus is therefore placed on differences therebetween in the following description. First, in the storage device 52, a color map 170a and a height map 172a of the moon as a base model and the reference map 50a of the background as illustrated in FIG. 11 are stored. In the present mode, further, color maps 170b and 170c of the hill and the rock, represented as part models, and height maps 172b and 172c thereof are also stored therein.

With respect to the color maps 170b and 170c of the hill and the rock, links are set at a region 174a in the color map 170a of the moon. With respect to the height maps 172a and 172b of the hill and the rock, links are set at a region 174b in the height map 172a of the moon. Note that, in this example, each of the color map 170b and the height map 172b of the hill is hierarchical data and that each of the color map 170c and the height map 172c of the rock is data having a single resolution.

Further, in this example, a partial region in a map having a maximum resolution in the hierarchical data of each of the color map 170a and the height map 172a of the moon has been subjected to what is generally called a reduction process for reducing the amount of data. In the figure, there is a description of "reduction" on each of half regions of the maps to indicate that the amount of data has been reduced therein. For example, a region that is unlikely to be displayed when the viewpoint has become close may be purposefully reduced in quality to minimize occurrence of unnecessary processing in generation of the reference map. Moreover, a resulting reduction in data size will lead to increased efficiency in memory access. It will be understood by those skilled in the art that there are various techniques that can be used for the reduction process.

The tile data acquisition section 74 of the image processing device 10 loads required pieces of tile data of reference maps, for example, in units of blocks, into the main memory 26 according to the movements of the viewpoint and the line of sight relative to the object. Here, in a case where the range of required data includes the regions 174a and 174b, at which the links are set, the target data determination section 72 identifies the reference maps of the part models associated with the regions, and includes the identified reference maps in the required data. Thus, the reference maps of the part models are also stored in the main memory 26.

While the figure illustrates a case where the whole reference maps of the part models are stored therein, only portions of the reference maps may naturally be loaded if only portions thereof are required data. Thereafter, as in FIG. 11, the decoding/decompression section 78 stores, in the memory 56 of the GPU 24, the pieces of tile data which have been decoded and decompressed, and the rendering section 82 renders the display image by using these pieces of tile data. The pieces of tile data of the reference maps have associated therewith identification information, the base shape, etc., of the object represented thereby. This enables the rendering section 82 to appropriately select and refer to reference maps of the object that lies on the path along which the ray travels, and render one object by using the plurality of reference maps.

In the present embodiment described above, the color map representing the distribution of color values over the surface of the three-dimensional object to be displayed and the height map representing the distribution of the height relative to the base shape thereof are acquired in advance, and when the three-dimensional object is displayed, the pixel values are determined through ray tracing with reference to the color map and the height map. This enables high-speed rendering of the display image without complicated computation using, for example, a rendering equation. In addition, since sufficient time can be taken to generate the maps, increased image quality can be achieved.

Further, since the color map and the height map are prepared as hierarchical data having a plurality of resolutions, display of even a huge model, such as that of a planet, can be changed seamlessly and with low delay with a comparable processing load for a great change in magnification. Even when the original hierarchical data has a large size at this time, saving of memory capacity and increased efficiency in access can be achieved by identifying the required range in the three-dimensional space of the hierarchical data and acquiring data of only this portion to develop the acquired data in the memory.

Using the hierarchical structure of the reference map and setting a link to another reference map or other data therein makes it possible to give various changes as the viewpoint moves. For example, switching the reference map to a reference map of a part model representing only a particular portion in detail makes it possible to accurately represent a structure that cannot be represented with use of a base model representing the whole. Moreover, a reduction in overall data size can be achieved with the level of detail of the particular portion being maintained. As a result, the object to be displayed can be represented with low delay without a loss in precision even when a great change in the viewpoint and/or the line of sight occurs.

The present invention has been described above with reference to the embodiment thereof. It should be understood by those skilled in the art that the above embodiment has been described by way of example only, that various modifications are possible with respect to combinations of constituent elements and processes thereof, and that such modifications also fall within the scope of the present invention.

INDUSTRIAL APPLICABILITY

As will be apparent from the foregoing description, the present invention is applicable, for example, to various types of information processing devices, such as an image processing device, a head-mounted display, a game device, a content processing device, an image display device, a portable terminal, and a personal computer, and to an image processing system including any of these information processing devices.

REFERENCE SIGNS LIST

1: Image display system
10: Image processing device
14: Input device
16: Display device
20: Content server
22: CPU
24: GPU
26: Main memory
32: Communication section
34: Storage section
36: Output section
52: Storage device

56: Memory
70: Input information acquisition section
72: Target data determination section
74: Tile data acquisition section
76: Compressed data storage section
78: Decoding/decompression section
80: Tile data storage section
82: Rendering section
84: Output section

The invention claimed is:

1. A device comprising:

one or more processors; and one or more computer-readable media having stored thereon instructions that, when executed with the one or more processors, cause the device to, at least:

load first portions of hierarchical data representing, in a first resolution, both (a) a first color map representing a distribution of color values over a surface of a first object to be displayed and (b) a first height map representing a distribution of heights from a first base shape surface to the surface of the first object, the first portions being required for rendering of the first object;

load second portions of the hierarchical data representing, in a second resolution different from the first resolution, both (a) a second color map representing a distribution of color values over a surface of a second object to be displayed and (b) a second height map representing a distribution of heights from a surface of a second base shape to the surface of the second object, the second object incorporating the second base shape arranged on the surface of the first object, the second portions being required for rendering of the second object;

obtain a first point on the first object at which a first ray in ray tracing arrives, by referring to the first height map and based on the first resolution of the first height map, and acquire a first color value of the first object at the first point by referring to the first color map and based on the first resolution of the first color map, to determine a first pixel value of a display image;

obtain a second point on the second object at which a second ray in the ray tracing arrives, by referring to the second height map and based on the second resolution of the second height map, and acquire a second color value of the second object at the second point by referring to the second color map and based on the second resolution of the second color map, to determine a second pixel value of the display image; and output data of the display image including a rendering of at least a portion of the first object and at least a portion of the second object.

2. The device according to claim 1, wherein the instructions further cause the device to:

determine a region in a three-dimensional space formed by a plane of one of the first color map, the first height map, or an axis of resolution, on a basis of a viewpoint and a line of sight for the first object, wherein data of each of the first color map and the first height map is loaded corresponding to the region.

3. The device according to claim 2, wherein the hierarchical data has a link region at which a switch to other data is set in the three-dimensional space, and wherein the instructions further cause the device to load the other data when the link region is included in the region.

4. The device according to claim 3, wherein the instructions further cause the device to:

acquire, as the other data, a third color map and a third height map generated separately with respect to a portion of the first object, and determine a third pixel value representing the portion of the first object by using the other data.

5. The device according to claim 3, wherein the instructions further cause the device to:

acquire, as the other data, data for representing a portion of the first object with a model of a different type, and determine a third pixel value representing the portion of the first object by using the other data.

6. The device according to claim 1, wherein, in at least any one of the first color map and the first height map, changes in a parameter other than resolution are given to data represented by layers of the hierarchical data.

7. The device according to claim 1, wherein the first color map includes a distribution of a reflection coefficient over the surface of the first object, and wherein the instructions further cause the device to:

correct the first color value on a basis of the reflection coefficient.

8. The device according to claim 1, wherein the instructions further cause the device to:

determine the first pixel value on a basis of color values and heights obtained by filtering of data of a range on the first color map or the first height map, the range corresponding to each of pixel regions on a view screen matching a current viewpoint and line of sight.

9. The device according to claim 1, wherein the instructions further cause the device to:

decode and decompress a portion of loaded compression-encoded data, and store resulting data in an internal memory of a graphics processing unit.

10. The device according to claim 1, wherein the distribution of heights of the first height map is different from the distribution of heights of the second height map.

11. The device according to claim 1, wherein the first base shape is different from the second base shape.

12. The device according to claim 1, wherein the second ray in the ray tracing does not pass through the first object and the second object is a background of the display image.

13. The device according to claim 1, wherein at least one of the first resolution and the second resolution changes based on a change in a viewpoint associated with the display image.

14. The device according to claim 1, wherein the first object and the second object correspond to a same object viewed from different viewpoints.

15. The device according to claim 1, wherein a shape of at least one of the first object and the second object changes based on a change in a viewpoint associated with the display image.

16. The device according to claim 1, wherein a color of at least one of the first object and the second object changes based on a change in a viewpoint associated with the display image.

17. The device according to claim 1, wherein at least one of the first height map and the second height map changes based on a change in a viewpoint associated with the display image.

18. The device according to claim 1, wherein at least one of the first color map and the second color map changes based on a change in a viewpoint associated with the display image.

19. A method comprising:

loading, into a memory, first portions of hierarchical data representing, in a first resolution, both (a) a first color map representing a distribution of color values over a surface of a first object to be displayed and (b) a first height map representing a distribution of heights from a first base shape surface to the surface of the first object, the first portions being required for rendering of the first object;

loading second portions of the hierarchical data representing, in a second resolution different from the first resolution, both (a) a second color map representing a distribution of color values over a surface of a second object to be displayed and (b) a second height map representing a distribution of heights from a surface of a second base shape to the surface of the second object, the second object incorporating the second base shape arranged on the surface of the first object, the second portions being required for rendering of the second object;

obtaining a first point on the first object at which a first ray in ray tracing arrives, by referring to the first height map and based on the first resolution of the first height map, and acquiring a first color value of the first object at the first point by referring to the first color map and based on the first resolution of the first color map, to determine a first pixel value of a display image;

obtaining a second point on the second object at which a second ray in the ray tracing arrives, by referring to the second height map and based on the second resolution of the second height map, and acquiring a second color value of the second object at the second point by referring to the second color map and based on the second resolution of the second color map, to determine a second pixel value of the display image; and outputting data of the display image including a rendering of at least a portion of the first object and at least a portion of the second object.

20. A non-transitory, computer-readable storage medium containing a computer program, which when executed by a computer, causes the computer to carry out actions, comprising:

loading first portions of hierarchical data representing, in a first resolution, both (a) a first color map representing a distribution of color values over a surface of a first object to be displayed and (b) a first height map representing a distribution of heights from a first base shape to the surface of the first object, the first portions being required for rendering of the first object;

loading second portions of the hierarchical data representing, in a second resolution different from the first resolution, both (a) a second color map representing a distribution of color values over a surface of a second object to be displayed and (b) a second height map representing a distribution of heights from a surface of a second base shape to the surface of the second object, the second object incorporating the second base shape arranged on the surface of the first object, the second portions being required for rendering of the second object;

obtaining a first point on the first object at which a first ray in ray tracing arrives, by referring to the first height map and based on the first resolution of the first height map, and acquiring a first color value of the first object at the first point by referring to the first color map and based on the first resolution of the first color map, to determine a first pixel value of a display image;

obtaining a second point on the second object at which a second ray in the ray tracing arrives, by referring to the second height map and based on the second resolution of the second height map, and acquiring a second color value of the second object at the second point by referring to the second color map and based on the second resolution of the second color map, to determine a second pixel value of the display image; and outputting data of the display image including a rendering of at least a portion of the first object and at least a portion of the second object.

* * * * *